(12) United States Patent
Gilde et al.

(10) Patent No.: US 9,300,635 B1
(45) Date of Patent: Mar. 29, 2016

(54) OVERLAY NETWORK WITH POSITION INDEPENDENT INSERTION AND TAP POINTS

(71) Applicant: Tempered Networks, Inc., Seattle, WA (US)

(72) Inventors: Robert George Gilde, Issaquah, WA (US); Jeffrey Anthony Pancottine, Bellevue, WA (US)

(73) Assignee: Tempered Networks, Inc., Seattle, WA (US)

( * ) Notice: Subject to any disclaimer, the term of this patent is extended or adjusted under 35 U.S.C. 154(b) by 0 days.

(21) Appl. No.: 14/740,053

(22) Filed: Jun. 15, 2015

(51) Int. Cl.
| | |
|---|---|
| *G06F 9/00* | (2006.01) |
| *H04L 29/06* | (2006.01) |
| *H04L 12/24* | (2006.01) |
| *H04L 12/715* | (2013.01) |
| *H04L 9/00* | (2006.01) |
| *H04L 12/26* | (2006.01) |

(52) U.S. Cl.
CPC ............ *H04L 63/0281* (2013.01); *H04L 9/006* (2013.01); *H04L 41/0843* (2013.01); *H04L 41/28* (2013.01); *H04L 43/08* (2013.01); *H04L 45/64* (2013.01); *H04L 63/0485* (2013.01); *H04L 63/166* (2013.01)

(58) Field of Classification Search
CPC ... H04L 63/0281; H04L 41/28; H04L 63/166; H04L 63/0485; H04L 9/006; H04L 43/08; H04L 41/0843; H04L 45/64
USPC .......................................................... 726/12
See application file for complete search history.

(56) References Cited

U.S. PATENT DOCUMENTS

| | | |
|---|---|---|
| 5,835,727 A | 11/1998 | Wong et al. |
| 6,981,156 B1 | 12/2005 | Stern et al. |

(Continued)

FOREIGN PATENT DOCUMENTS

| | | |
|---|---|---|
| WO | 2007038872 A1 | 4/2007 |
| WO | 2008039506 A2 | 4/2008 |

OTHER PUBLICATIONS

Asguard Networks, Inc., "SimpleConnectTM Product Information," Retrieved on Nov. 9, 2012, from http://www.asguardnetworks.com/product (1 page).

(Continued)

*Primary Examiner* — Mohammad W Reza
(74) *Attorney, Agent, or Firm* — John W. Branch; Lowe Graham Jones PLLC

(57) ABSTRACT

Embodiments are directed to managing secure communication between a plurality of node computers over a network. If overlay networks for node computers are provided for communicating between the node computers, a mesh network may be configured. If a node computer that may be associated with the overlay networks sends a communication to other node computers also associated with the overlay networks, a gateway computer associated with the node computer may perform actions to process the communication. The gateway computer may select an overlay network based on the node computer. Target gateway computers associated with the other node computers may be determined based on the overlay network and the mesh network. Physical paths from the gateway computer to the target gateway computers may be determined. The gateway computer may send the communication to the target gateway computers over the physical paths and then to the other node computers.

26 Claims, 15 Drawing Sheets

(56) References Cited

U.S. PATENT DOCUMENTS

| | | | |
|---|---|---|---|
| 7,881,199 | B2 | 2/2011 | Krstulich |
| 7,996,894 | B1 | 8/2011 | Chen et al. |
| 8,959,513 | B1 | 2/2015 | Swaminathan |
| 2002/0073182 | A1 | 6/2002 | Zakurdaev et al. |
| 2004/0268121 | A1 | 12/2004 | Shelest et al. |
| 2007/0019641 | A1 | 1/2007 | Pai et al. |
| 2008/0307519 | A1 | 12/2008 | Curcio et al. |
| 2009/0210518 | A1 | 8/2009 | Verma et al. |
| 2010/0024026 | A1 | 1/2010 | Ylonen et al. |
| 2010/0214959 | A1 | 8/2010 | Kuehnel et al. |
| 2010/0218235 | A1 | 8/2010 | Ganot |
| 2010/0254395 | A1* | 10/2010 | Smith et al. .......... 370/401 |
| 2011/0016509 | A1 | 1/2011 | Huang et al. |
| 2011/0090892 | A1* | 4/2011 | Cooke ............... 370/338 |
| 2011/0103393 | A1* | 5/2011 | Meier et al. .......... 370/401 |
| 2011/0141881 | A1 | 6/2011 | Joshi et al. |
| 2013/0018993 | A1 | 1/2013 | Hui et al. |
| 2014/0150070 | A1 | 5/2014 | Peterson |
| 2014/0223507 | A1 | 8/2014 | Xu |
| 2014/0307744 | A1* | 10/2014 | Dunbar et al. ........ 370/401 |
| 2015/0046997 | A1 | 2/2015 | Gupta et al. |

OTHER PUBLICATIONS

Asguard Networks, Inc., "Welcome to Asguard Networks," Retrieved on Oct. 23, 2012, from http://www.asguardnetworks.com/ (1 page).

Asguard Networks, Inc., "SimpleConnectTM Quick Start Documentation Guide," Revision 1, Dec. 13, 2012 (18 page).

Henderson, T. et al., "HIP-based Virtual Private LAN Service (HIPLS)," Network Working Group, Internet-Draft, The Boeing Company, Nov. 6, 2012 (16 pages).

International Search Report and Written Opinion for International Patent Application No. PCT/US2014/023632 mailed on Jun. 23, 2014 (13 pages).

Asguard Networks, Inc., "Gray Matter Systems Announces Asguard Networks Partnership at 2012 Gray Matter Systems Training and User Group Meeting," Aug. 9, 2012, retrieved on Oct. 23, 2012, from http://www.asguardnetworks.com/news (2 pages).

Trusted Computing Group, Incorporated, "TCG Trusted Network Connect:IF-MAP Metadata for ICS Security," Specification Version 1.0, Revision 44, May 8, 2014 (64 pages).

Office Communication for U.S. Appl. No. 14/204,907 mailed on Jul. 10, 2015 (20 pages).

Aoyagi, S. et al., "ELA: A Fully Distributed VPN System Over Peer-to-Peer Network," Proceedings of the 2005 Symposium on Applications and the Internet, 2005, IEEE, Computer Society (4 pages).

Benyamina, D, et al., "Wireless Mesh Networks Design—A Survey," IEEE Communications Survey & Tutorials, vol. 14, No. 2, Second Quarter 2012, pp. 299-310.

International Search Report and Written Opinion for International Patent Application No. PCT/US2015/042993 mailed on Nov. 11, 2015, 11 pages.

Office Communication for U.S. Appl. No. 14/204,907 mailed on Dec. 2, 2015 (14 pages).

Office Communication for U.S. Appl. No. 14/814,283 mailed on Nov. 30, 2015 (8 pages).

* cited by examiner

OVERLAY NETWORK WITH POSITION INDEPENDENT INSERTION AND TAP POINTS

TECHNICAL FIELD

The present invention relates generally to network management, and more particularly, but not exclusively, to managing network communication in an industrial networking environment.

BACKGROUND

Industrial equipment, such as manufacturing equipment used to build or assemble products, may be supported by an industrial networking and/or communications network. In industrial networks, operations of machines that control industrial processes (e.g., manufacturing, machining, stamping, product packaging, or the like) may be arranged to communicate with other machines and/or computers over the industrial network. In some cases, such communication may be related to supervising and controlling operations of the various industrial machines. Also, the industrial network may be used for collect data from the industrial machines for monitoring a manufacturing or assembly process, monitoring and improving operational efficiency and throughput, quality control, or the like.

In some cases, the communication/network protocols used in industrial communications networks may differ from, or be incompatible with, standard communications protocols used for business networks. In some cases this establishing connectivity relationships between the two types of networks challenging. In addition, many industrial communication systems were not designed with information security in mind, but now require secure connectivity to be compatible with business network security protocols, or to be compliant with regulatory standards. Thus, it is with respect to these and other considerations that these innovations are made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DETAILED DESCRIPTION OF THE EMBODIMENTS

Figure 1:
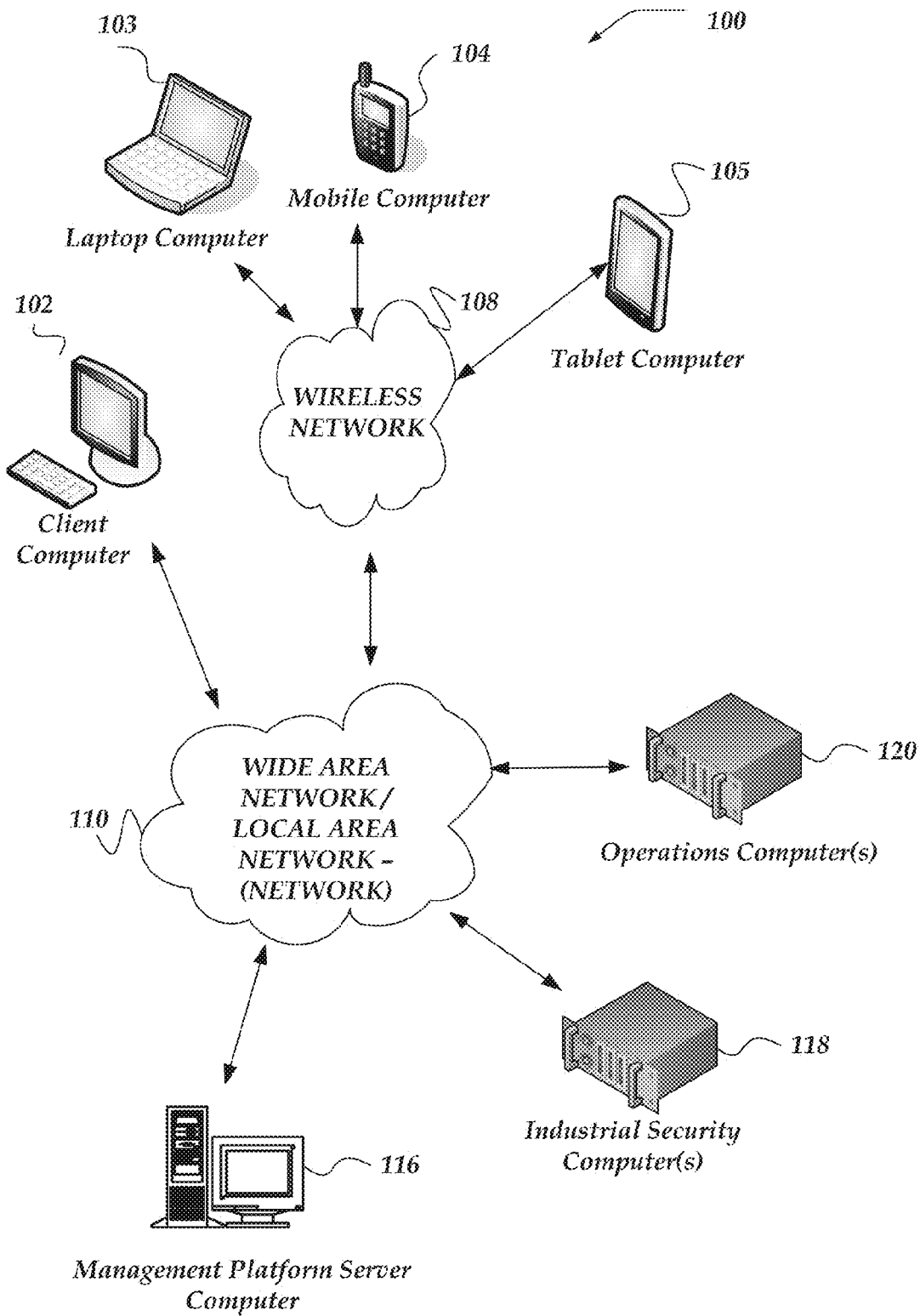
FIG. 1 shows components of one embodiment of an environment in which embodiments of the invention may be practiced.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the terms "mesh network," "industrial network" refer to a network of industrial computer/machines, workstations, client computers, gateway computers, traffic management computers, network monitoring computers, or the like. The term mesh network used herein describes both the typical network topology of a network in an industrial operation environment as well as more generally, a networked system used to perform operations in an industrial environment, such as, as factory floor, manufacturing complex, oil refinery, or the like. In the interest of clarity such networks (including machines and computers on the network) are referred to as mesh networks even when their topology and/or configuration is not strictly a "mesh" network and/or partial "mesh" network.

As used herein the term "physical network" refers to the actual industrial communication network that interconnects one or more industrial machines/computers. The physical network may be a physical and/or native network device/components used to connect one or more industrial computers and/or industrial devices (machine) in a factory/industrial complex. Physical networks include network interfaces, wire, wireless hotspots, switches, routers, repeaters, or the like, that comprise the physical network. Also, physical networks may be considered to include the native communication protocols, network topology, and so on, that may be used to setup a mesh network in an industrial environment. In some cases, physical networks may be arranged to enable open communication between node computers, (e.g., machines, workstations, and so on), gateway computer, or the like, that are on the physical network.

As used herein the terms "node," and "node computer" refer to computers that are endpoint computer interconnected over a physical network. Node computers may include client computers, network computers, industrial workstations, press machines, robots, packaging machines, automated milling machines, automated printing presses, pumps, valves, boilers, or the like. Node computers are considered to be computer/device connected to the physical network exclusive of gateway computers, network monitoring computer, and traffic management computers.

As used herein the terms "source node," and "source node computer" refer to a node computer that is the originating endpoint of a network communication.

As used herein the terms "target node," and "target node computer" refer to a node computer that is the ultimate intended destination of a communication. In some embodiments, a source node computer may be communicating to one or more other node computers over an industrial/mesh network. These intended recipients of these communication may be considered target node computers. Accordingly, a node computer may be a target node computer if it receives communications and it may be a source node computer if it sends communications.

As used herein the terms "gateway," "gateway computer, "industrial security computer," and "industrial security appliance" refer to computers connected to an industrial network that are disposed between the node computers and the physical network. Gateway computers may be network computers that may be arranged to provide security, access control, communication routing, or the like, for the mesh network. In some embodiments, gateway computer may be configured by another network computer, such as, a management platform computer.

As used herein the terms "target gateway," and "target gateway computer" refer to one or more gateway computers that are disposed between the target node computers that may be the intended recipients of a communication in a mesh network.

As used herein the term "management platform computer," "management platform server computer" refer to one or more network computers that may be arranged to provide administrative and/or configuration services to one or more computer, such as, gateway computers, that may be in a mesh network.

As used herein the term "traffic management computer (TMC)" refers to a computer that may be arranged to monitor and managed network traffic that, in most cases, flows through the traffic management computer. Traffic management computers, may be firewalls, application delivery computers, proxying devices, caching computers, load balancers, or the like, or combination thereof. In some cases, traffic management computers may actively control and/or direct one or more network connection flows that are provided to it. In some embodiments, a gateway computer may be arranged to perform one or more functions of a TMC.

As used herein the term "network monitoring computer (NMC)" refers to a network computer that may be arranged to passively monitor communication (e.g., network traffic, network packets). NMCs may be installed/configured such that they are provided network traffic information even though the NMC may not be disposed between participants of the communication. NMCs may monitor the content of the network traffic and generate notifications, logs, or the like, as appropriate. For example, in some embodiments, a NMC may be an intrusion detection computer that is arranged to detect malicious and/or suspicious activity by passively observing traffic on a network. In some embodiments, a gateway computer, or a TMD may be arranged to perform NMC functions.

As used herein the term "overlay network" refers to logical networks that may be overlaid on a physical network. Overlay networks may be comprised of one or more virtual private LAN segments, systems of VPN tunnels, other communication tunnels, or the like. Overlay networks may be generated by one or more gateway computers that enforce one or more virtual or emulated intercommunication path between endpoints (e.g., node computers. gateway computer, TMCs, NMCs, or the like) in a mesh network. In some embodiments, overlay networks may be statically defined. Or, in some embodiments, overlay networks may be dynamically generated depending on the type of endpoints, communication, users, or the like.

Endpoints, such as, node computers that may be restricted to an overlay network, may only see other computers/devices that are also on the same overlay network. In some embodiments, endpoints, may be included in more than one overlay network at the same time. Also, some endpoints may be arranged to directly access physical networks for some types of communication and use overlay networks for other types of communication.

As used herein the terms "network path," and "path" refer to a particular route between one or more endpoints through a physical network. A network path for given communication may be determined and/or enforced by a gateway computer.

In some cases, network paths may be defined statically, in other cases, network paths may be determined dynamically.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing secure communication between a plurality of node computers over a network. In at least one of the various embodiments, if one or more overlay networks for two or more of the plurality of node computers may be provided for securely communicating, a mesh network between the two or more node computers may be configured, such that the mesh network may include one or more gateway computers that may provide secure access to the two or more node computers. In at least one of the various embodiments, if the one or more overlay networks for the two or more of the plurality of node computers are updated, the mesh network between the two or more node computers may be reconfigured based on one or more updates to the one or more overlay networks.

Also, in at least one of the various embodiments, if a node computer associated with the one or more overlay networks sends a communication to one or more other node computers that may be also associated with the one or more overlay networks, a gateway computer associated with the node computer may perform additional actions to process the communication.

In at least one of the various embodiments, the gateway computer may select an overlay network based on the node computer and one or more characteristics of the communication. In at least one of the various embodiments, the one or more characteristics of the communication may include, one or more of a source identity, a source address, a user identity, a user role, a destination identity, a destination address, an application type, a source machine type, a whitelist, a target machine type, or the like.

In at least one of the various embodiments, one or more target gateway computers that are associated with the one or more other node computers may be determined based on the overlay network and a topology of the mesh network for secure communication. In at least one of the various embodiments, the secure communication may include using one or more of Secure Sockets Layer (SSL), Transport Layer Security (TLS), Internet Protocol Security (IPsec), Public Key Infrastructure (PKI), encryption, authentication, or the like.

In at least one of the various embodiments, one or more physical paths from the gateway computer to the one or more target gateway computers may be determined based on the topology of the mesh network. In at least one of the various embodiments, the one or more physical paths to the one or more target gateway computers may be modified to include a route to one or more traffic management computers and to include a route from the one or more traffic management computers to the one or more target gateway computers based on the topology of the mesh network.

In at least one of the various embodiments, determining the one or more physical paths to the one or more target gateway computers may include determining one or more portions of the communication based on configuration information and the one or more characteristics of the communication; determining one or more other physical paths that include a route to one or more network monitoring computers based on the topology of the mesh network; and providing the one or more determined portions of the communication to the one or more network monitoring computers over the one or more other physical paths.

In at least one of the various embodiments, determining the one or more physical paths may further include, determining a particular route through the mesh network topology based on one or more performance characteristics of the one or more physical paths.

In at least one of the various embodiments, the gateway computer may securely send the communication to the one or more target gateway computers over the one or more physical paths, such that the one or more target gateway computers securely provides the communication to the one or more other node computers.

In at least one of the various embodiments, if the communication sent by the node computer to one or more other node computers that are unassociated with the one or more overlay networks, the communication may be determined to be undeliverable.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, Management Platform Server Computer 116, Industrial Security Computer(s) 118, Operations Computer(s) 120, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, management platform server computer 116, industrial security computers 118, operations computers 120, or other computers.

Client computers 102-105 may further be configured to include a client application that enables an end-user to log into an end-user account that may be managed by another computer, such as management platform server computer 116, industrial security computers 118, operations computers 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, storage management server computer 116, storage computer 118, storage computer 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of storage management server computer 116 is described in more detail below in conjunction with FIG. 3. Briefly, however, storage management server computer 116 includes virtually any network computer capable of managing data storage in network environment for one or more applications or services.

Although FIG. 1 illustrates management platform server computer 116, industrial security computers 118, operations computers 120 each as a single computer, the innovations and/or embodiments are not so limited. For example, one or more functions of management platform server computer 116, industrial security computers 118, operations computers 120, or the like, may be distributed across one or more distinct network computers. Moreover, management platform server computer 116, industrial security computers 118, operations computers 120 are not limited to a particular configuration such as the one shown in FIG. 1. Thus, in one embodiment, management platform server computer 116, industrial security computers 118, operations computers 120 may be implemented using a plurality of network computers. In other embodiments, server computer may operate as a plurality of network computers within a cluster architecture, a peer-to-peer architecture, or the like. Further, in at least one of the various embodiments, management platform server computer 116, industrial security computers 118, operations computers 120 may be implemented using one or more cloud instances in one or more cloud networks.

Also, in at least one of the various embodiments, one or more management platform server computers, or at least some or all of the features thereof, may be incorporated in an industrial security computer, such as, industrial security computer 118, or an operation computer, such as, operations computer 120. Accordingly, these innovations and embodiments are not to be construed as being limited to a single environment, and other configurations, and architectures are also envisaged.

Illustrative Client computer

Figure 2:
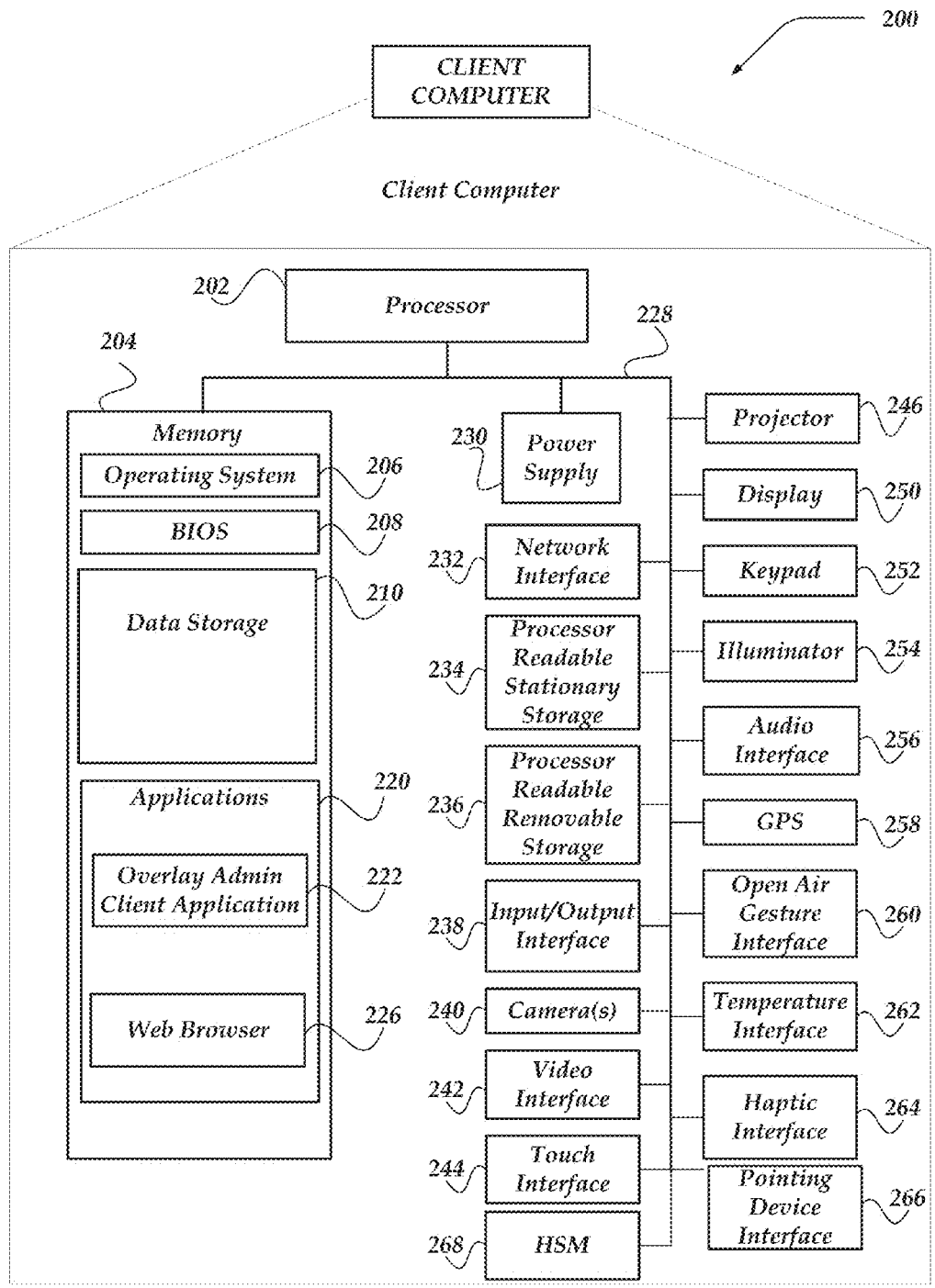
FIG. 2 shows one embodiment of a client computer that may be included in a system in accordance with at least one of the various embodiments.

FIG. 2 shows one embodiment of client computer 200 that may include many more or less components than those shown. Client computer 200 may represent, for example, at least one embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring and/or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements and/or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others and/or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch and/or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication and/or provide light. Illuminator 254 may remain active for specific periods of time or in response to events. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing and/or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, and/or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input and/or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In at least one embodiment, however, client computer 200 may, through other components, provide other information that may be employed to determine a physical location of the client computer, including for example, a Media Access Control (MAC) address, IP address, and the like.

Human interface components can be peripheral devices that are physically separate from client computer 200, allowing for remote input and/or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that may be configured to receive and to send web pages, web-based messages, graphics, text, multimedia, and the like. The client computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, and/or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components and/or operating system operations via Java application programs.

Memory 204 may further include one or more data storage 210, which can be utilized by client computer 200 to store, among other things, applications 220 and/or other data. For example, data storage 210 may also be employed to store information that describes various capabilities of client computer 200. The information may then be provided to another device or computer based on any of a variety of events, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, and/or otherwise process instructions and data. Applications 220 may include, for example, overlay administration client application 222. In at least one of the various embodiments, overlay administration client application 222 may be used to exchange communications to and from management platform server computer 116, including, but not limited to, queries, searches, API calls, or the like.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Illustrative Network Computer

Figure 3:
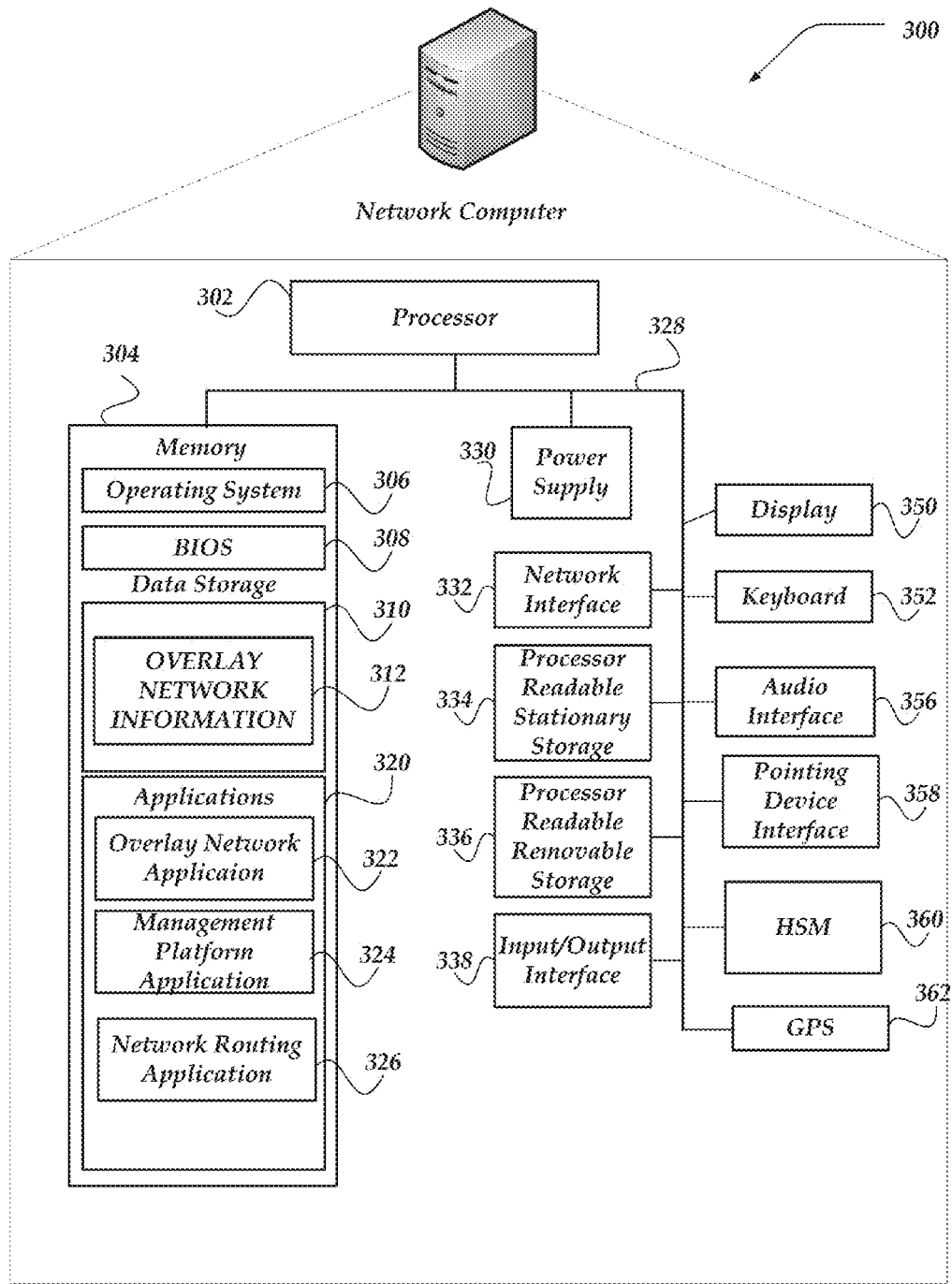
FIG. 3 shows one embodiment of a network computer, in accordance with at least one of the various embodiments.

FIG. 3 shows one embodiment of network computer 300 that may be included in a system implementing the invention. Network computer 300 may include many more or less components than those shown in FIG. 3. However, the components shown are sufficient to disclose an illustrative embodiment for practicing these innovations. Network computer 300 may represent, for example, one embodiment of at least one of management platform server computer 116, industrial security computer(s) 118, or industrial operations computer(s) 120 of FIG. 1.

As shown in the figure, network computer 300 includes a processor 302 in communication with a memory 304 via a bus 328. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others and/or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. Display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

GPS transceiver 362 can determine the physical coordinates of network computer 300 on the surface of the Earth, which typically outputs a location as latitude and longitude values. GPS transceiver 362 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 362 can determine a physical location for network computer 300. In at least one embodiment, however, network computer 300 may, through other components, provide other information that may be employed to determine a physical location of the client computer, including for example, a Media Access Control (MAC) address, IP address, and the like.

Human interface components can be physically separate from network computer 300, allowing for remote input and/or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

Memory 304 may include Random Access Memory (RAM), Read-Only Memory (ROM), and/or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's IOS® operating system. The operating system may include, or interface with a Java virtual machine module that enables control of hardware components and/or operating system operations via Java application programs. Likewise, other runtime environments may be included.

Memory 304 may further include one or more data storage 310, which can be utilized by network computer 300 to store, among other things, applications 320 and/or other data. For example, data storage 310 may also be employed to store information that describes various capabilities of network computer 300. The information may then be provided to another device or computer based on any of a variety of events, including being sent as part of a header during a communication, sent upon request, or the like. Data storage 410 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, overlay network information 312, or the like. Overlay network information 312 may contain various data generated for defining overlay networks, such as, routing information, and one or more policies associated with one or more mesh networks.

Applications 320 may include computer executable instructions which, when executed by network computer 300, transmit, receive, and/or otherwise process messages (e.g., SMS, Multimedia Messaging Service (MMS), Instant Message (IM), email, and/or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include overlay network application 322, management platform application 324, and/or network routing application 326 which may be enabled to perform actions further described below. In at least one of the various embodiments, one or more of the applications may be implemented as modules and/or components of another application. Further, in at least one of the various embodiments, applications may be implemented as operating system extensions, modules, plugins, or the like.

Furthermore, in at least one of the various embodiments, overlay network application 322, management platform application 324, and/or network routing application 326 may be operative in a cloud-based computing environment. In at least one of the various embodiments, these applications, and others, that comprise the management platform may be executing within virtual machines and/or virtual servers that may be managed in a cloud-based based computing environment. In at least one of the various embodiments, in this context the applications may flow from one physical network computer within the cloud-based environment to another depending on performance and scaling considerations automatically managed by the cloud computing environment. Likewise, in at least one of the various embodiments, virtual machines and/or virtual servers dedicated to overlay network application 322, management platform application 324, and/or network routing application 326 may be provisioned and de-commissioned automatically.

Also, in at least one of the various embodiments, overlay network information 312, or the like, may located in virtual servers running in a cloud-based computing environment rather than being tied to one or more specific physical network computers.

Overlay network administration application 322 may be a process or service that is arranged to communicate with one or more industrial security computers, such as, industrial computers 118, and/or one or more operations computers, such as, operations computers 120. Likewise, management platform application 324 may be a process or service that is arranged to communicate with one or more industrial security computers, such as, industrial computers 118, and/or one or more operations computers, such as, operations computers 120. Further, in at least one of the various embodiments, the overlay network administration application 322 and/or management platform application 324 may be arranged to provide configuration information to one or more of industrial computers 118, or operations computers 120. Also, in at least one of the various embodiments, the overlay network administration application 322 and/or management platform application 324 may be arranged to obtain notifications, logging information, status reports, security alerts, or the like, or combination thereof, from one or more of industrial computers 118, or operations computers 120.

Further, network computer 300 may also comprise hardware security module (HSM) 360 for providing additional tamper resistant safeguards for generating, storing and/or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, and/or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), the network computer may include an embedded logic hardware device instead of a CPU, such as, an Application Specific Integrated Circuit (ASIC), Field Programmable Gate Array (FPGA), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical System Architecture

Figure 4:
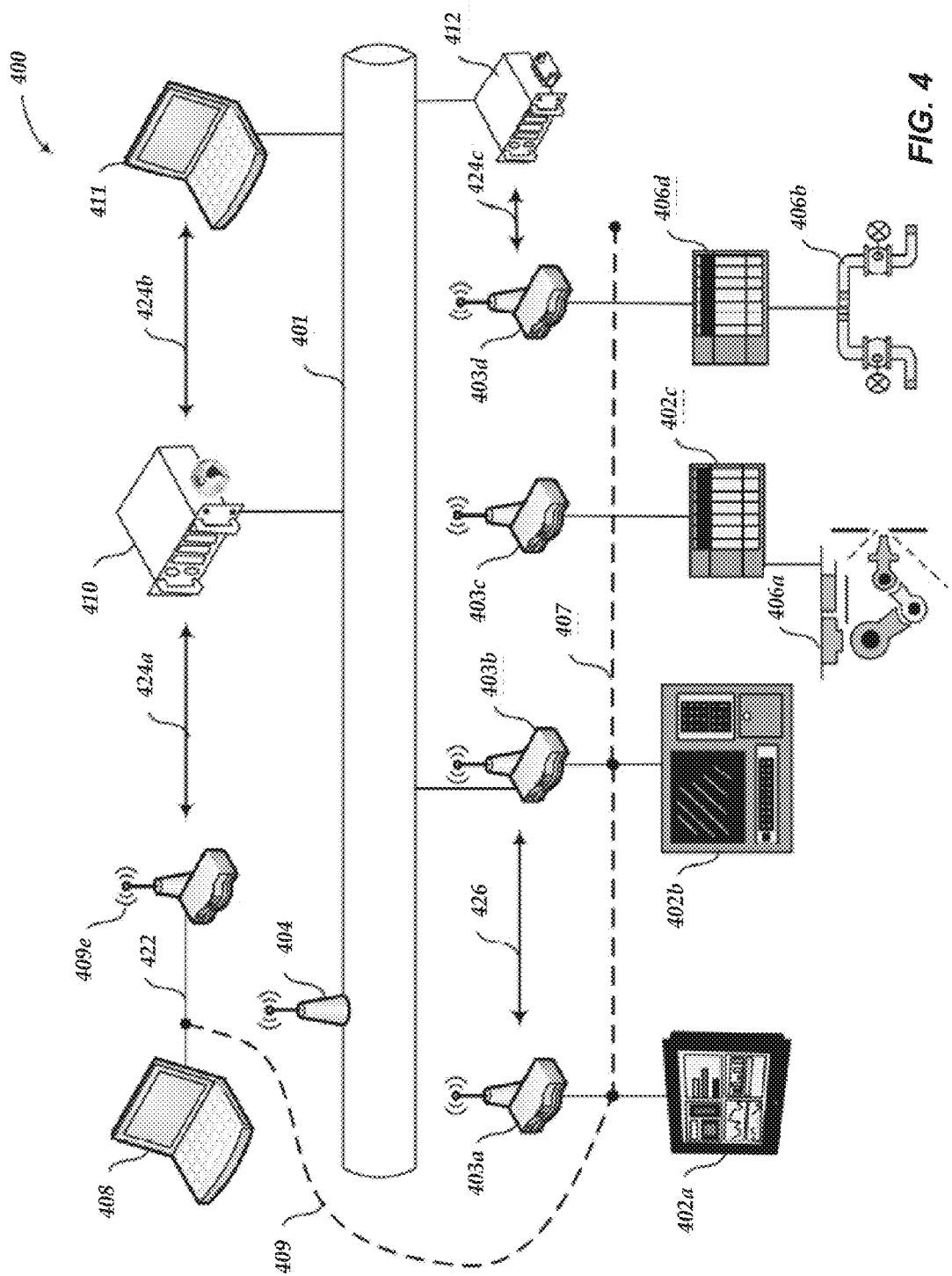
FIG. 4 shows a logical architecture of a networked environment 400 in accordance with at least one of the various embodiments.

FIG. 4 shows a logical architecture of networked environment 400 that is in accordance with at least one of the various embodiments. In at least one of the various embodiments, business network 401 is coupled to a plurality of operations computer 402a-402d (four shown, collectively 402) via a plurality of industrial security application computers (ISAs) 403a-403e (five shown, collectively 403). ISAs 403 may be coupled directly to the business network 401, or wirelessly via a wireless connection port 404. Each of the operations computers 402 may be coupled directly or wirelessly to one or more industrial computers 406a-406b (two shown, collectively 406), such as, for example, an automated manufacturing machine or tooling (e.g., numerically controlled machinery) that processes a product. The ISAs 403 communicate with one another via a private overlay network 407. A remote user (e.g., a remote engineer) 408 may connect to the private overlay network 407 via a remote access wireless communication path 409. In at least one of the various embodiments, management platform computer 410 and an associated, such as, user station 411 may be coupled to business network 401.

In at least one of the various embodiments, management platform computer 410, ISAs 403, and user station 411 may be, for example one or more network computers, such as, network computer 300 or one or more client computers, such as, client computer 200. ISAs 403 can be introduced into networked environment 400 as protective devices, each ISA 403 associated with, and coupled to, a particular operations computer 402. ISAs 403 can be provider edge (PE) devices/computers that provide dynamic, secure connectivity among operations computers 402, and between operations computers 402 and business network 401. In at least one of the various embodiments, ISAs can be physical computers or they can be implemented as virtualized computers. A virtual ISA may constitute software that may perform the same or similar functions as a corresponding processor-based computer. The software implementing a virtual ISA can be hosted on a system or a device that is not otherwise dedicated to providing secured networked communications, e.g., a local device, a remote device, client computer, network computer, or a server in a cloud-based computing environment. As described above ISAs may also be referred to as gateway computers that may be employed to isolate the physical network from nodes, such as industrial computers and workstations.

In at least one of the various embodiments, private overlay network 407 may be a virtual network—a logical construct (shown as a dotted line in FIG. 4)—that may be overlaid onto an existing physical infrastructure that includes existing business network 401 and the existing operations computers 402. Further, in at least one of the various embodiments, private overlay network 407 may be a virtual private LAN service (VPLS) that connects physically separate LAN segments (e.g., the business network and the industrial network) into a single logical LAN segment. However, the private overlay network provides an isolated environment that is segmented from the business network. Private overlay network 407 may be configured as a dynamic mesh network. The term "full mesh" refers to a mesh network topology in which every node is coupled to every other node. A dynamic mesh network is a policy-constrained mesh in which each communicates with only certain other designated nodes. Segments of virtual private overlay network 407 may be enabled or disabled by management platform computer 410, in response to mesh policy decisions received from a user via user station 411.

In at least one of the various embodiments, DHCP server 412 may be coupled to business network 401 to administer connecting various corporate devices to business network 401. Communications traffic 424a-424b on the business network side of communications environment 400 can be HTTP Web traffic which is encrypted. However, communications traffic 424c to and from DHCP server 412 may be non-encrypted. Communications traffic 426 between ISAs 403 coupled to the private overlay network may be encrypted. For enhanced security, management of connections to the private overlay network may be administered in a secure, distributed fashion by ISAs 403.

Operations computers 402 may take various forms. For example, the operations computers 402 may be industrial equipment controllers that control processing equipment 406a in a manufacturing operation. Additionally or alternatively, operations computers 402 may be distributed utility devices for controlling utilities 406b (e.g., factory utilities, municipal water systems, power systems, energy delivery systems, and the like). Alternatively, operations computers 402 may be controllers or workstations for operating medical equipment (e.g., medical imaging equipment) in a medical facility. Alternatively, operations computers 402 can themselves be networks of operational equipment, for example, networks located at different manufacturing sites that are part of the same business or corporation. Alternatively, operations computer 402 can be workstations or servers in an office-based operation.

In at least one of the various embodiments, each operations device 402 may be logically or otherwise associated with one or more industrial devices, such as, industrial devices 406. Operations computer 402 can be processor-based customer edge (CE) devices that may take any of a large variety of forms, including but not limited to personal computers (e.g., client computers, network computers, desktop computers, laptop computers, notebook computers, tablet computers, smart phones, workstation computers, and/or mainframe computers, and the like.) At least operations computers 402, ISAs 403, and management platform computer 410 may be capable of communication, for example via one or more networks 407, (e.g., Wide Area Networks, Local Area Networks, or packet switched communications networks such as the Internet, Worldwide Web portion of the Internet, extranets, intranets, and/or various other types of telecommunications networks such as cellular phone and data networks, and plain old telephone system (POTS) networks. See, also, wireless network 108, network 110 in FIG. 1. One or more communications interface devices may provide communications between operations computers 402 and network(s) 407, 401. The communications interface devices may take any of a wide variety of forms, including modems (e.g., DSL modem, cable modem), routers, network switches, and/or bridges, etc. The communications interface devices can be built into the operations devices or, if separate from operations computers 402, can communicate with the operations computers 402 using a wired communication channel, a wireless communication channel, or combinations thereof. The operations computers 402 may be coupled to an industrial network.

In at least one of the various embodiments, operations computers 402, ISAs 403, and management platform computer 410 include at least one non-transitory processor-readable storage medium (e.g., hard drive, RFID, RAM). The storage medium stores instructions for causing the associated device to perform various functions as described below.

In many implementations the non-transitory processor-readable storage medium may constitute a plurality of non-transitory storage media. The plurality of non-transitory storage media may be commonly located at a common location, or distributed at a variety of remote locations. Databases may be implemented in one, or across more than one, non-transitory computer- or processor-readable storage media. Such database(s) may be stored separately from one another on separate non-transitory processor-readable storage medium or may be stored on the same non-transitory processor-readable storage medium as one another. The non-transitory processor-readable storage medium may be co-located with management platform computer 410, for example, in the same room, building or facility. Alternatively, the non-transitory processor-readable storage medium may be located remotely from management platform 410, for example in a different facility, city, state or country. Electronic or digital information, files or records or other collections of information may be stored at specific locations in non-transitory processor-readable media, thus are logically addressable portions of such media, which may or may not be contiguous.

Networked environment 400 shown in FIG. 4 is representative. Typical networked environments may include additional, or fewer, computer systems and entities than illustrated in FIG. 4.

Figure 5:
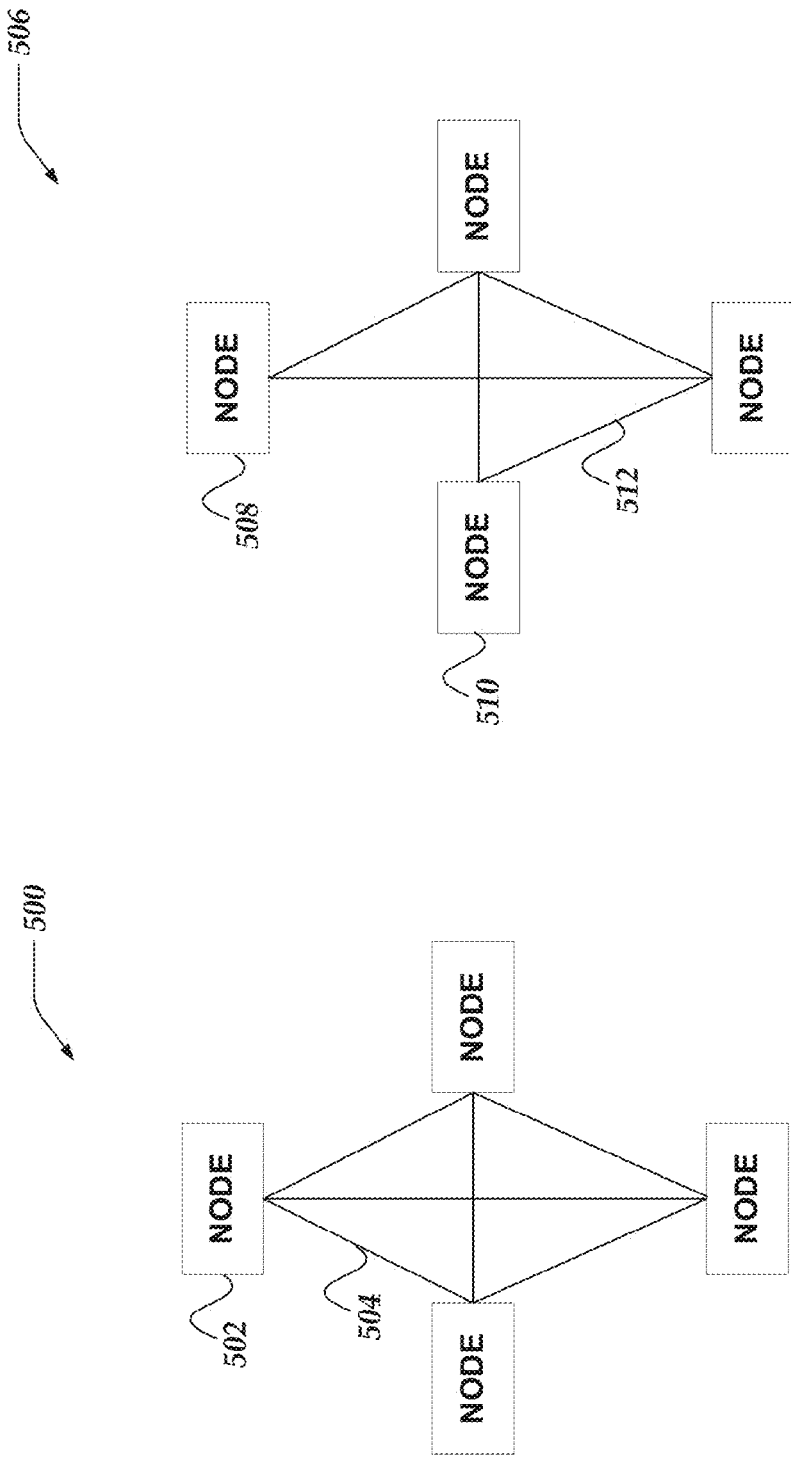
FIG. 5 shows a logical architecture of mesh networks arranged in accordance with at least one of the various embodiment.

FIG. 5 shows a logical architecture of mesh network 500 and mesh network 506 that are arranged in accordance with at least one of the various embodiment. In at least one of the various embodiments, mesh network 500 illustrates an example of how multiple nodes may be interconnected using a mesh network. In at least one of the various embodiments, physical network 504 may represent a physical network that connects the various nodes to each other in mesh network 500. In at least one of the various embodiments, mesh network 500 may be arranged such that each node in the network may be connected to each other node using physical network 504. In at least one of the various embodiments, mesh network 500 may be considered a full mesh network since each node is directly connected to each other node in the mesh network by a physical network.

Similarly, in at least one of the various embodiments, mesh network 506 may be considered a partial mesh network because one or more nodes on the network are not directly connected using the physical network. In this example, node 508 and node 510 are not directly connected. However, physical network 512 may still enable node 508 and node 510 to communicate indirectly. In at least one of the various embodiments, physical network 504 and physical network 512 may be networks, such as, network 108, network 110, network 401, or the like, or combination thereof.

In at least one of the various embodiments, the nodes in mesh network 500 and mesh network 506, such as, node 502, node 508, and node 510 may be considered as representing computers, such as, client computers 102-105, management platform computer, 116, industrial security computer 118, operations computers 120 (from FIG. 1). Also, in at least one of the various embodiments, nodes may represent computers and devices described in FIG. 4.

Figure 6:
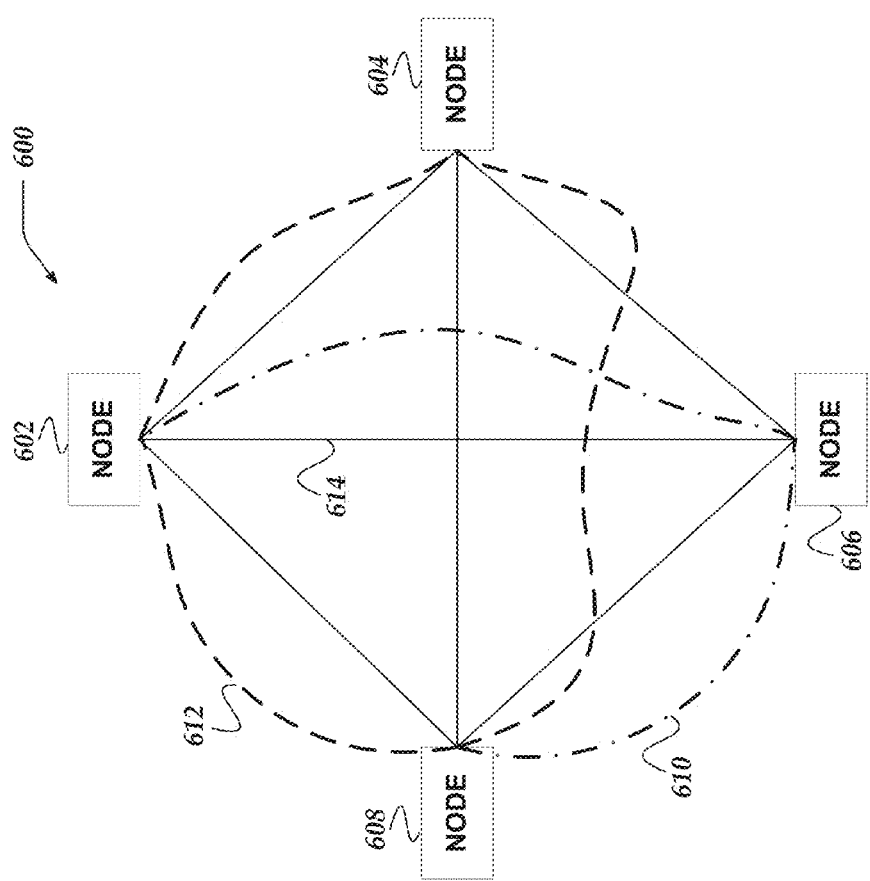
FIG. 6 illustrates a logical schematic of a mesh network that includes an overlay network in accordance with at least one of the various embodiments.

FIG. 6 illustrates a logical schematic of mesh network 600 that includes overlay network in accordance with at least one of the various embodiments. In at least one of the various embodiments, mesh network 600 may be comprised of multiple nodes, such as, node 602, node 604, node 606, node 608, or the like, connection by physical network 614.

In at least one of the various embodiments, one or more overlay networks, such as, overlay network 610 and overlay network 612 may be arranged to overlay on physical network

614. In at least one of the various embodiments, the overlay networks may represent a virtual and/or logical network that employs an underlying physical network, such as, physical network 614 to communicate information among nodes. In at least one of the various embodiments, the overlay networks represent how communication may logically flow through mesh network. Accordingly, from the point of view of a user and/or a node, communication (e.g., send or receive network traffic) between nodes may occur over the one or more overlay networks.

For example, in mesh network 600, communication between node 602, node 608, and node 604 may be communicated over physical network 614 using overlay network 612. Likewise, in mesh network 600, communication between node 602, node 606, and node 608 may be communicated using overlay network 610. Thus, in this example, assuming all node-to-node communication is restricted to overlay networks, node 606 may communicate with node 602 and node 608 using overlay network 610. And, in this example, node 606 may be prevented from communicating to node 604 because node 606 and node 604 are not sharing an overlay network.

Figure 7:
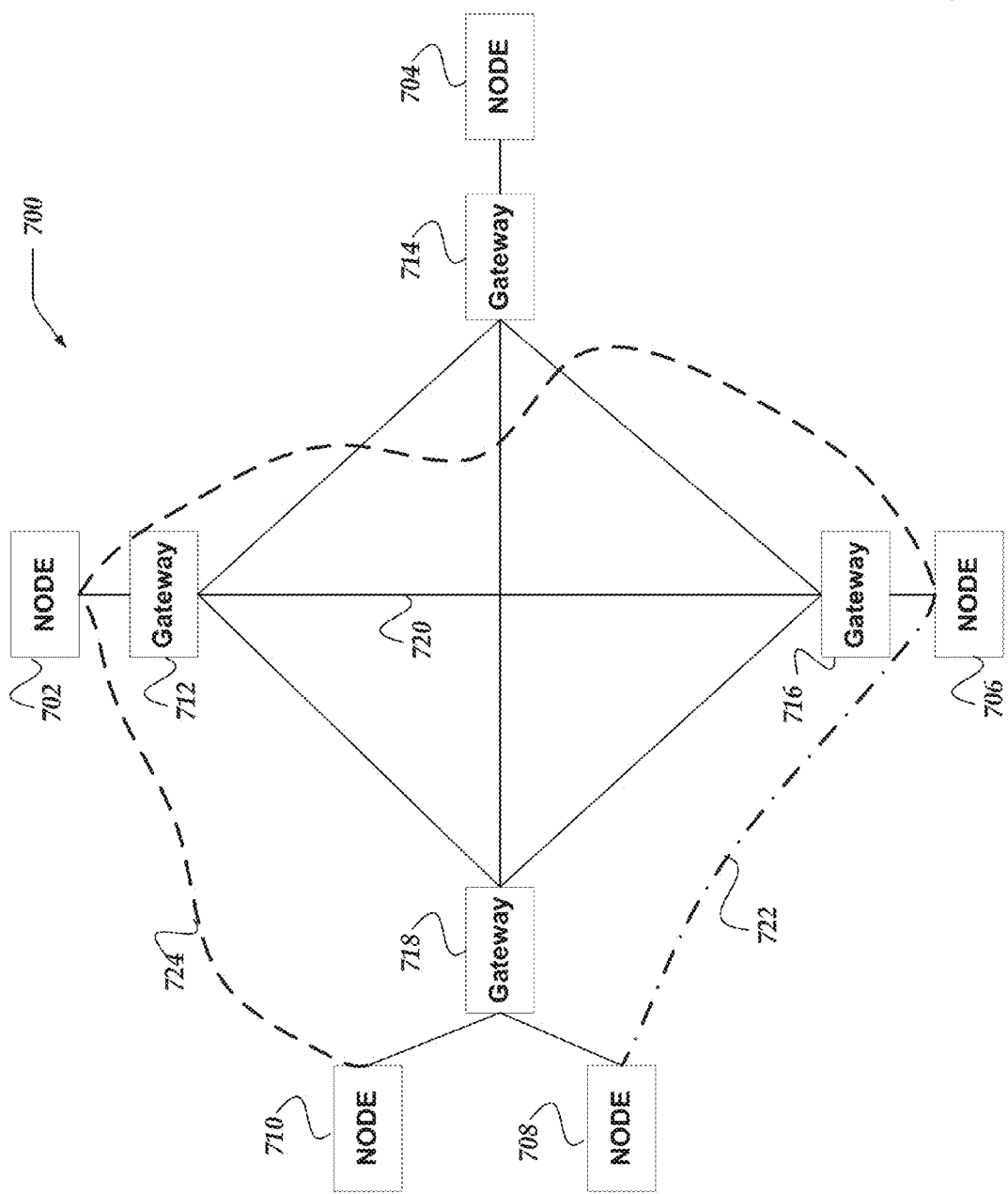
FIG. 7 illustrates a logical schematic of a mesh network that includes overlay networks and gateways, in accordance with at least one of the various embodiments.

FIG. 7 illustrates a logical schematic of mesh network 700 that includes overlay networks and gateways, in accordance with at least one of the various embodiments. Mesh network 700 is similar to mesh network 600 as described in FIG. 6. However, in at least one of the various embodiments, mesh network 700 is arranged to include gateway computers, such as, gateway computers 712-718. Gateway computers may be disposed between one or more nodes and the underlying physical network infrastructure. In at least one of the various embodiments, the gateway computers may be arranged such that they isolate node computers, such as, nodes 702-710 from the physical network used to interconnect them, In this example, physical network 720 represents the underlying physical network comprising mesh network 700. Node 704 is isolated from physical network 720 by gateway 714. Accordingly, in at least one of the various embodiments, the gateway computers may be configured to provide and/or enforce one or more overlay networks in mesh network 700. In this example, for some embodiments, overlay network 722 enables node 706 and node 708 to "see" each other on the network; communication from node 706 to node 708 may be routed through gateway computer 716 over a segment of network 720 to gateway computer 718; and the communication may then be routed from gateway computer 718 to node 708. From the point-of-view of node 706 and node 708 the communication goes directly over overlay network 722. In actuality the communication will be routed through physical network 720 between gateway computer 716 and gateway computer 718 using a particular network path through physical network 720 that may be statically and/or dynamically determined.

Likewise, in this example, mesh network 700 may be arranged, such that node 702, node 706, and node 710 communicate over overlay network 724. As described above, in at least one of the various embodiments, the communication among/between the nodes on overlay network 724 may be routed along a particular network path through physical network 720 and two or more of the gateway computers.

In at least one of the various embodiments, some nodes may be configured to use physical network 720 directly rather than using an overlay network. For example, in mesh network 700, node 704 is not associated with an overlay network so it may be arranged communicate directly on physical network 720 absent the abstraction of an overlay network.

In at least one of the various embodiments, the gateway computers may be configured with one or more rule-based policies that determine access and/or restrictions for network communication on the networks. The particular rules and/or restrictions associated with how communication information (e.g., network packets) should be routed through the mesh network may be established by a management platform computer, such as management platform server computer 116, or the like. Configuration information may be pushed (e.g., router tables) to each gateway computer to define the overlay networks, if any, as well other restrictions that may be applicable for the mesh network.

In at least one of the various embodiments, gateway computers may be arranged to include an explicit list of computer addresses/identities that are allowed to communicate with the gateway computer. Accordingly, if a node computer, such as, node computer 710 is in gateway computer 718's list of allowed computers (e.g., a whitelist) it may be enabled to initiate communication over the mesh network through gateway computer 718. Conversely, node computers, or any other computer for that matter, not in a gateway computer's whitelist may be denied access to that gateway computer and the mesh network. Though, in some embodiments, a node computer may be allowed to one or more particular gateway computers and denied accessed to others. In at least one of the various embodiments, a management platform computer (not shown in FIG. 7) may be arranged to manage and distribute the whitelists to each gateway computer comprising a mesh network.

In at least one of the various embodiments, by placing gateway computers between physical network 720 and the node computers, the configuration and/or definition of one or more overlay networks may be accomplished without requiring the individual node computers to be reconfigured. Further, in at least one of the various embodiments, gateway computers may comprise industrial security computers that enable various routing, security and/or cryptography features to help secure the mesh network. Otherwise, in at least one of the various embodiments, the mesh network may be reliant on the security features of the node computers themselves which may be non-existent or very limited.

In at least one of the various embodiments, overlay networks may be enforced by using an overlay whitelist that defines the endpoints (e.g., node computer, gateway computers, or the like) that may be accessed from other members of the overlay network. Accordingly, in at least one of the various embodiments, the computers on a given overlay may be included on the overlay network whitelist. Likewise, in at least one of the various embodiments, computers absent from the overlay network may be omitted or excluded from the overlay network whitelist. Further, in at least one of the various embodiments, a computer may be included on more than one overlay network whitelist enabling it to be part of multiple overlay networks. In at least one of the various embodiments, a management platform computer (not shown in FIG. 7) may be arranged to manage and distribute the overlay whitelists to each gateway computer comprising a mesh network.

Figure 8:
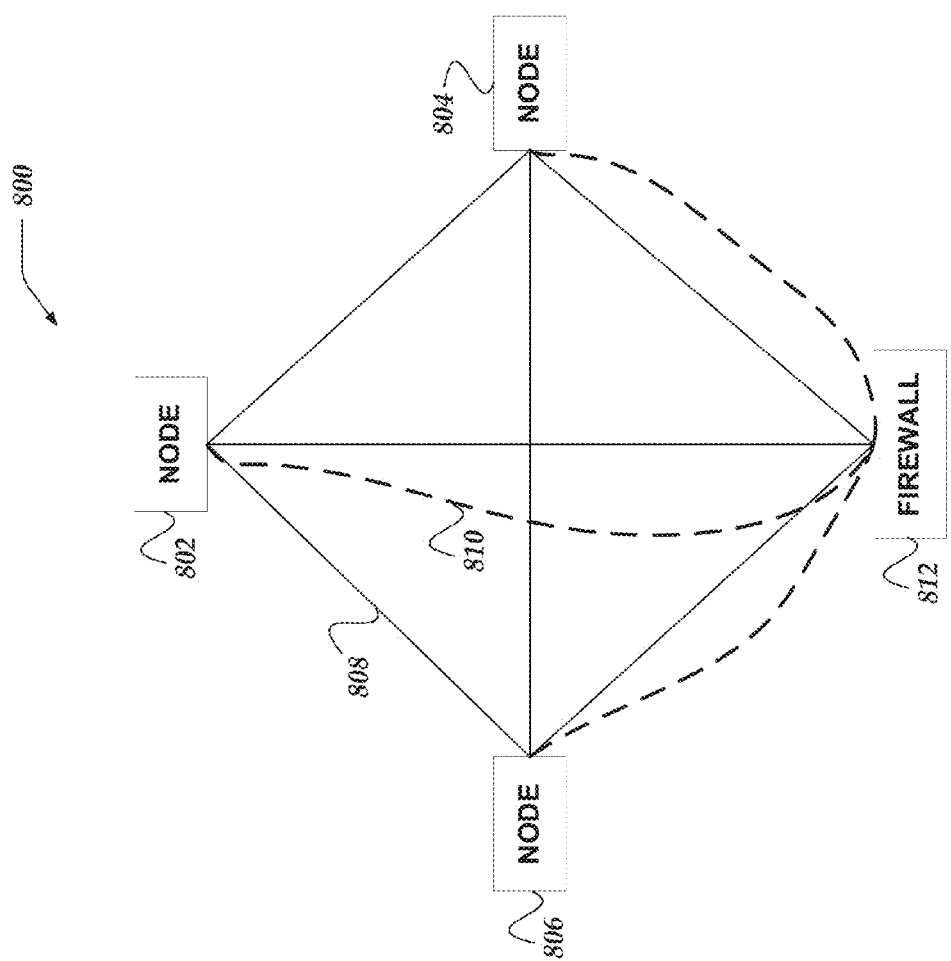
FIG. 8 illustrates a logical schematic of a mesh network that includes overlay networks and a firewall device in accordance with at least one of the various embodiments.

FIG. 8 illustrates a logical schematic of mesh network 800 that includes overlay networks and a firewall computer in accordance with at least one of the various embodiments. In at least one of the various embodiments, mesh network 800 may be arranged to include one or more node computers, such as, node 802, node 804, node 806, or the like. Nodes may be connected to each other using physical network 808. Further, one or more overlay networks, such as, overlay network 810 may be arranged to define how the nodes on the network may communicate with each (as described above).

In at least one of the various embodiments, a mesh network, such as, mesh network 812 may include one or more network traffic management computers, such as, firewall computer 812. Accordingly, in at least one of the various embodiments, an overlay network, such as, overlay network 810 may be arranged to route network communication through a determined network path in physical network 808 between/among one or more of the nodes through firewall computer 812. Routing communication through a network traffic management computer, such as, firewall 812, enables network administrators to configure and apply various rule-based policies, security policies, or the like, for network traffic management for mesh network 800.

In at least one of the various embodiments, a mesh network may include one or more traffic management computers. Accordingly, network paths determined for routing traffic through the TMCs may be optimized to include a particular TMC based on one or more characteristics of the communication. In some embodiments, different TMCs may be arranged to manage particular types of network traffic and/or be arranged to manage communication traffic for one or more particular endpoints computers.

Figure 9:
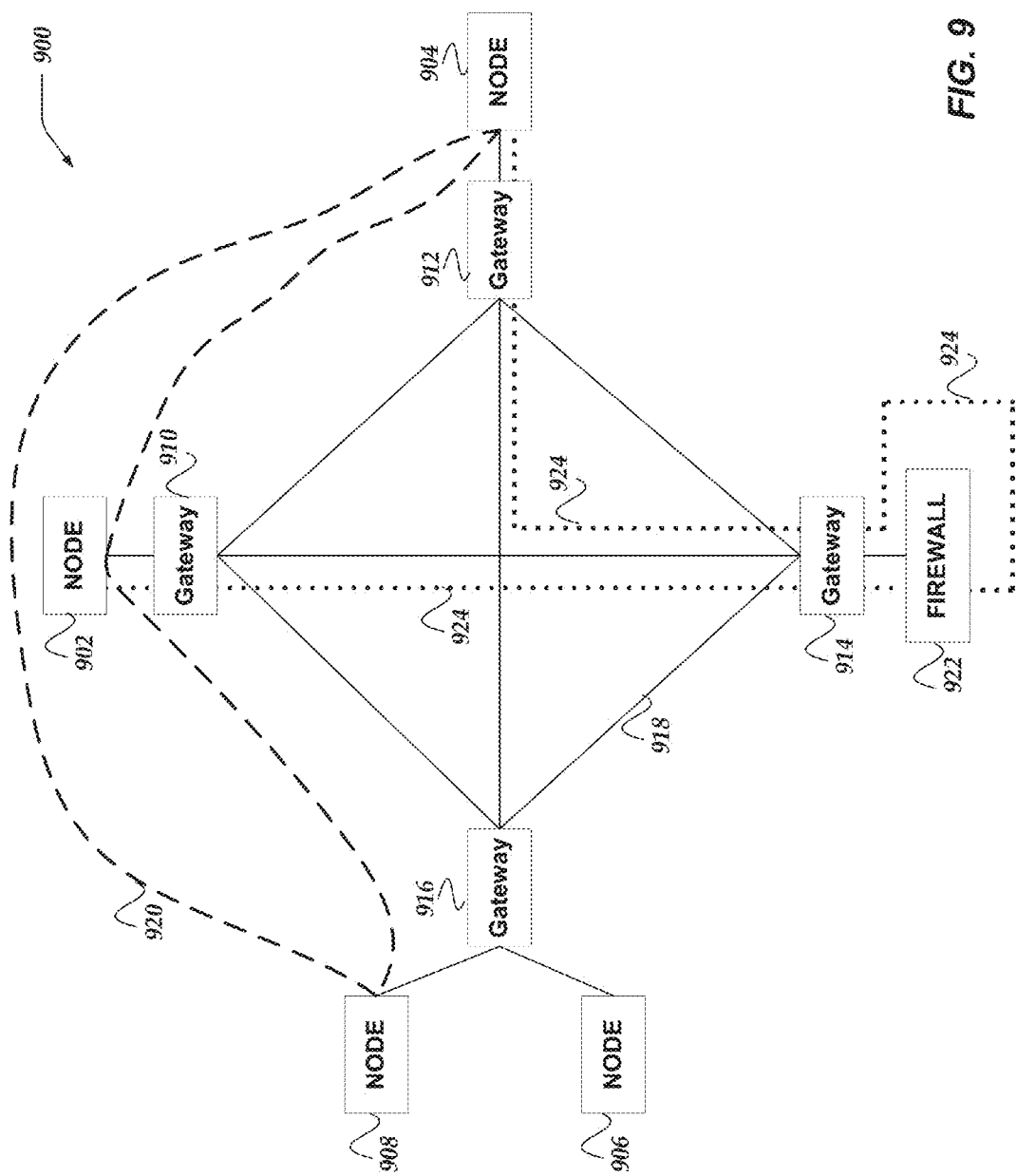
FIG. 9 illustrates a logical schematic of a mesh network that includes, gateway computers and a traffic management computer in accordance with at least one of the various embodiments.

FIG. 9 illustrates a logical schematic of mesh network 900 that includes, gateway computers and a traffic management computer in accordance with at least one of the various embodiments. In at least one of the various embodiments, mesh networks that include gateway computers, such as, mesh network 900 may also include one or more traffic management computers, such as, firewall computer 922.

In at least one of the various embodiments, gateway computers, such as, gateway computer 910, gateway computer 912, gateway computer 914, or gateway computer 916 may be connected to physical network 918 (similar to mesh network 700 shown in FIG. 7). Accordingly, in this example, node computers, such as, node 902, node 904, node 906, and node 908, may be directly coupled to gateway computers rather than being directly coupled to physical network 918.

In at least one of the various embodiments, mesh networks, such as, mesh network 900 may be arranged to include one or more overlay networks, such as, overlay network 920. As described above, overlay network 920 may be configured to enable node 902, node 904, and node 908 to be perceived/managed as if they are coupled to a network separate and/or independent from physical network 918.

In at least one of the various embodiments, a mesh network may include a traffic management computer, such as, firewall computer 922, to monitor and/or manage some or all of the network traffic in mesh network 900. Accordingly, in at least one of the various embodiments, firewall computer 922 may represent any network traffic management computer that may be configured to manage network traffic on mesh network 900. For example, firewall computer 922 may be configured to provide various network management services/features, such as, inbound/outbound traffic security, application routing, user access/security, or the like, or combination thereof.

In at least one of the various embodiments, overlay networks, such as, overlay network 920 may be configured such that computers coupled to the network are unaware of the underlying physical networks, such as physical network 918 in this example. Accordingly, node computers coupled together using an overlay network may operate as if they are directly communicating over the overlay network. However, in at least one of the various embodiments, the network administrators may require that some or all of the network traffic that is communicated using the overlay network be routed through a traffic management computer, such as, firewall 922. In some embodiments, it may be disadvantageous to include a traffic management computer in an overlay network. For example, the traffic management computer may be coupled to the actual network (e.g., physical network 918) such that it is not easily accessible to the overlay network. In some of embodiments, the policy/technical reasons for keeping the traffic management computer separate from the overlay network may vary, but may include, hiding the presence of a firewall from nodes on the overlay networks, reducing complexity of configuration management, or the like, or combination thereof. Accordingly, in at least one of the various embodiments, the underlying physical networks and/or the gateway computers may be configured to route some or all of the network communication of an overlay network through one or more traffic management computers.

In at least one of the various embodiments, mesh network 900 may be arranged to route all network traffic communicated between node 902 and node 904 through firewall computer 922. In at least one of the various embodiments, node 902 may be configured to be unaware of the location of firewall computer 922 since the firewall computer is not part of and/or coupled to overlay network 920. In at least one of the various embodiments, gateway computer 910 may enforce the firewall requirement by transparently routing some or all of the network traffic between node 902 and node 904 over physical network 918 and through firewall computer 922. Accordingly, in this example, communication from node 902 to node 904 may be routed through physical network 981 along path 924 to ensure that the network communication traffic may be provided to firewall computer 922. In at least one of the various embodiments, network configurations of gateway computer 910, gateway computer 914, and gateway computer 912 may be arranged to route some or all of network traffic between node 902 and node 904 through firewall computer 922. Otherwise, in this example, network communication traffic between node 902 and node 904 may be communicated directly by way of gateway computer 910 and gateway computer 912, bypassing gateway computer 914. The actual path the network traffic may take through physical network 918 may be configured by an administrator using a management platform computer, such as, management platform server computer 116, management platform computer 410, or the like.

In at least one of the various embodiments, a management platform computer may be arranged to automatically determine the path through the gateway computers and the underlying physical network to ensure that the appropriate network traffic may be routed through a traffic management computer, such as, firewall 922. Accordingly, the management platform computer may suggest or recommend a network path through the physical network, such as, path 924, to a user that may accept the path as is or modify it.

Figure 10:
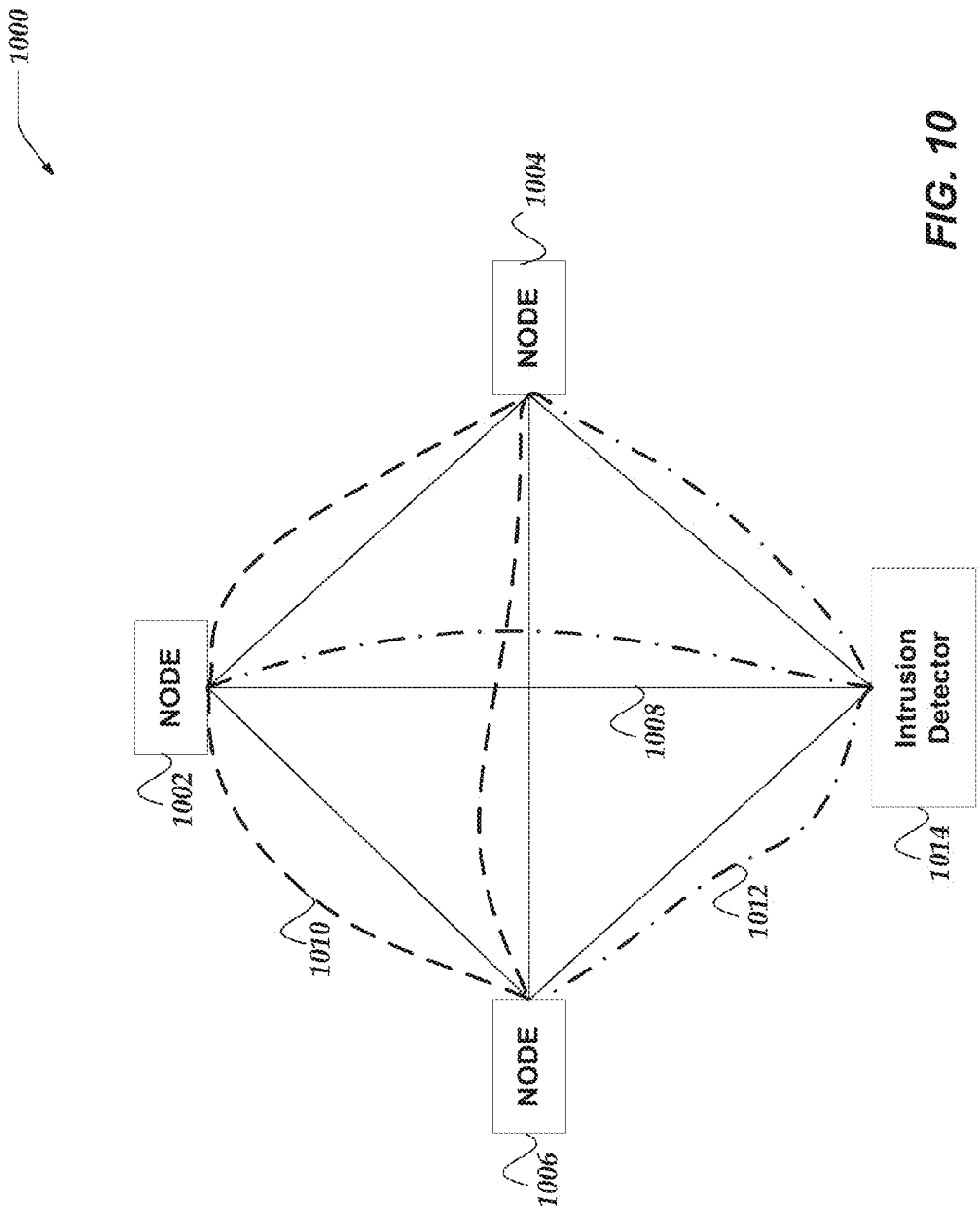
FIG. 10 illustrates a logical schematic of a mesh network that includes overlay networks and one or more network intrusion detectors in accordance with at least one of the various embodiments.

FIG. 10 illustrates a logical schematic of mesh network 1000 that includes overlay networks and one or more network intrusion detectors in accordance with at least one of the various embodiments. In at least one of the various embodiments, mesh network 1000 may comprise one or more nodes, such as, node 1002, node 1004, and node 1006 coupled together with physical network 1008. Also, in at least one of the various embodiments, mesh network 1000 may be arranged to include one or more overlay networks, such as, overlay network 1010 and overlay network 1012.

In at least one of the various embodiments, mesh network 1000 may be arranged to include a network traffic monitoring computer, such as, intrusion detector computer 1014. In some embodiments, a network monitoring computer, may be arranged to passively monitor some or all of the network traffic that is communicated over physical network 1008.

In at least one of the various embodiments, mesh network 1000 may be considered to be similar to mesh network 800 in FIG. 8, except that intrusion detector computer 1014 may be passively monitoring network traffic rather than performing traffic management. Accordingly, in at least one of the various embodiments, intrusion detector computer 1014 may be arranged to monitor network traffic that may be forwarded to it over the physical network, rather than being physically disposed between one or more node endpoints that are participating in the network communication.

Figure 11:
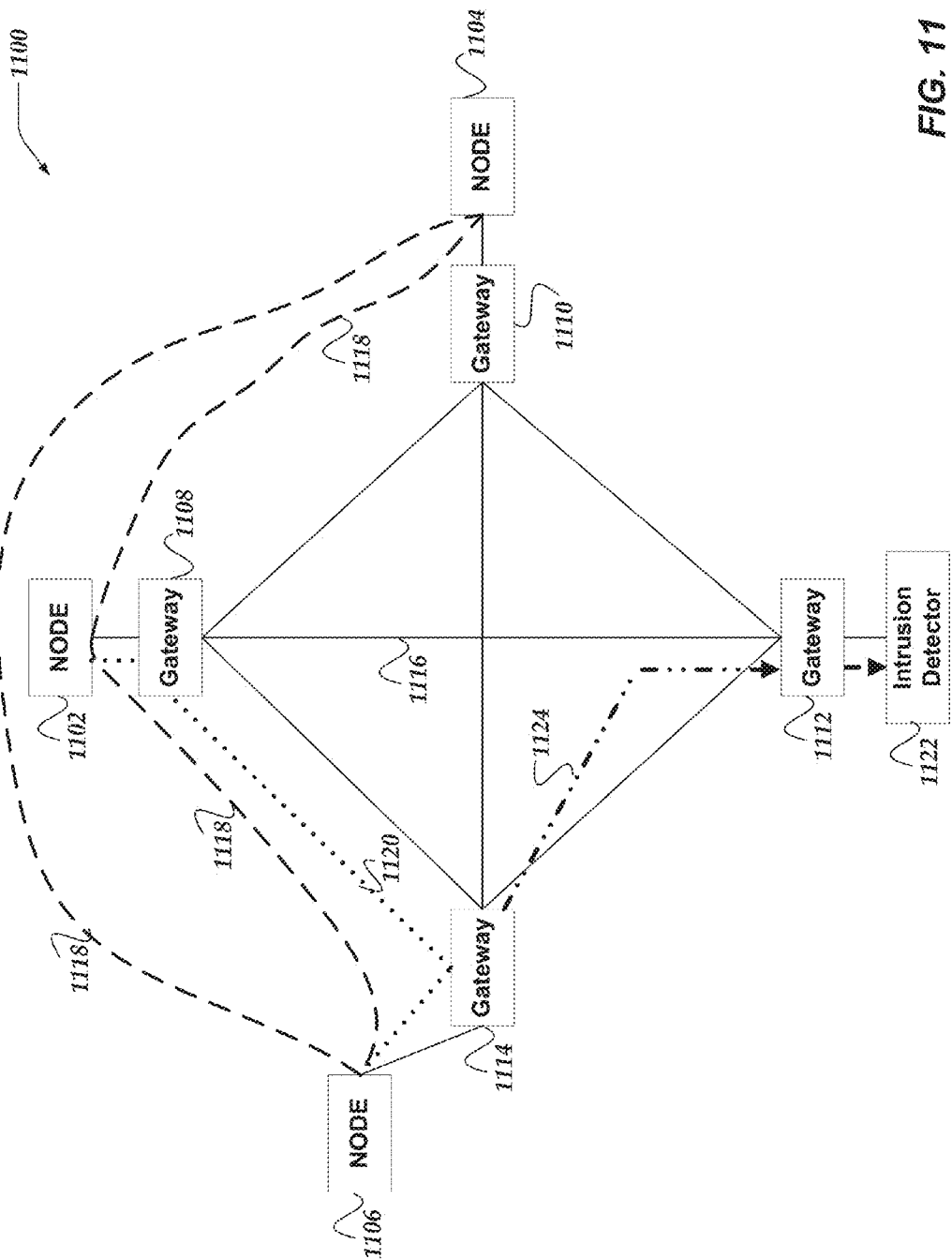
FIG. 11 illustrates a logical schematic of a mesh network that includes gateways, overlay networks, and one or more intrusion detectors in accordance with at least one of the various embodiments.

FIG. 11 illustrates a logical schematic of mesh network 1100 that includes gateways, overlay networks, and one or more intrusion detectors in accordance with at least one of the various embodiments. In at least one of the various embodiments, mesh network 1100 may be arranged similarly to mesh network 900, except instead of a firewall computer it may include one or more intrusion detector computers. In this example, mesh network 1100 include nodes, such as, node 1102, node 1104, and node 1106; gateway computers, such as, gateway computer 1108, gateway computer 1110, and gateway computer 1112; physical network 1116; overlay networks, such as, overlay network 1118; network intrusion detector 1122; or the like.

In at least one of the various embodiments, network path 1120 may be the route through physical network 1116 that network traffic is communicated between node 1106 and node 1102 based on overlay network 1118. Accordingly, in this example, network path 1120 passes through gateway computer 1108 and gateway computer 1114.

In at least one of the various embodiments, network path 1124 represents a physical network path of network traffic (e.g., network packets) that may be provided to a network monitoring computer, such as, intrusion detector 1122. Since in most cases, including this example, network monitoring computers may not be physically disposed between the endpoints of a network communication, the network traffic may be need to be provided to the network monitoring computer using a separate physical network path. Accordingly, gateway computers, such as, gateway computer 1114 may be arranged to forward (over the physical network) network packets from some or all of the network traffic it sees to one or more network monitoring computers, such as, intrusion detection computer 1122.

In at least one of the various embodiments, a management platform computer may be arranged to configure the one or more gateway computers in a mesh network, such as, mesh network 1100, to establish one or more overlay networks. Also, the management platform computer may be arranged to define one or more network paths through the physical network that may be used for providing network traffic to one or more network monitoring computers.

Generalized Operations

FIGS. 12-15 represent the generalized operation of overlay network with position independent insertion and tap points in accordance with at least one of the various embodiments. In at least one of the various embodiments, processes 1200, 1300, 1400, and 1500 described in conjunction with FIGS. 12-15 may be implemented by and/or executed on a management platform computer, an industrial security computer, a network computer, or the like, such as, network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computers, such as, those in a cloud-based environment. However, embodiments are not so limited and various combinations of network computers, client computers, or the like may be utilized. Further, in at least one of the various embodiments, the processes described in conjunction with FIGS. 12-15 may be used for communication in a mesh network with overlay networks in accordance with at least one of the various embodiments and/or architectures such as those described in conjunction with FIGS. 4-11. Further, in at least one of the various embodiments, some or all of the action performed by processes 1200, 1300, 1400, and 1500 may be executed in part by overlay network application 318, management platform application 319, and network routing application 320, or the like, or combination thereof.

Figure 12:
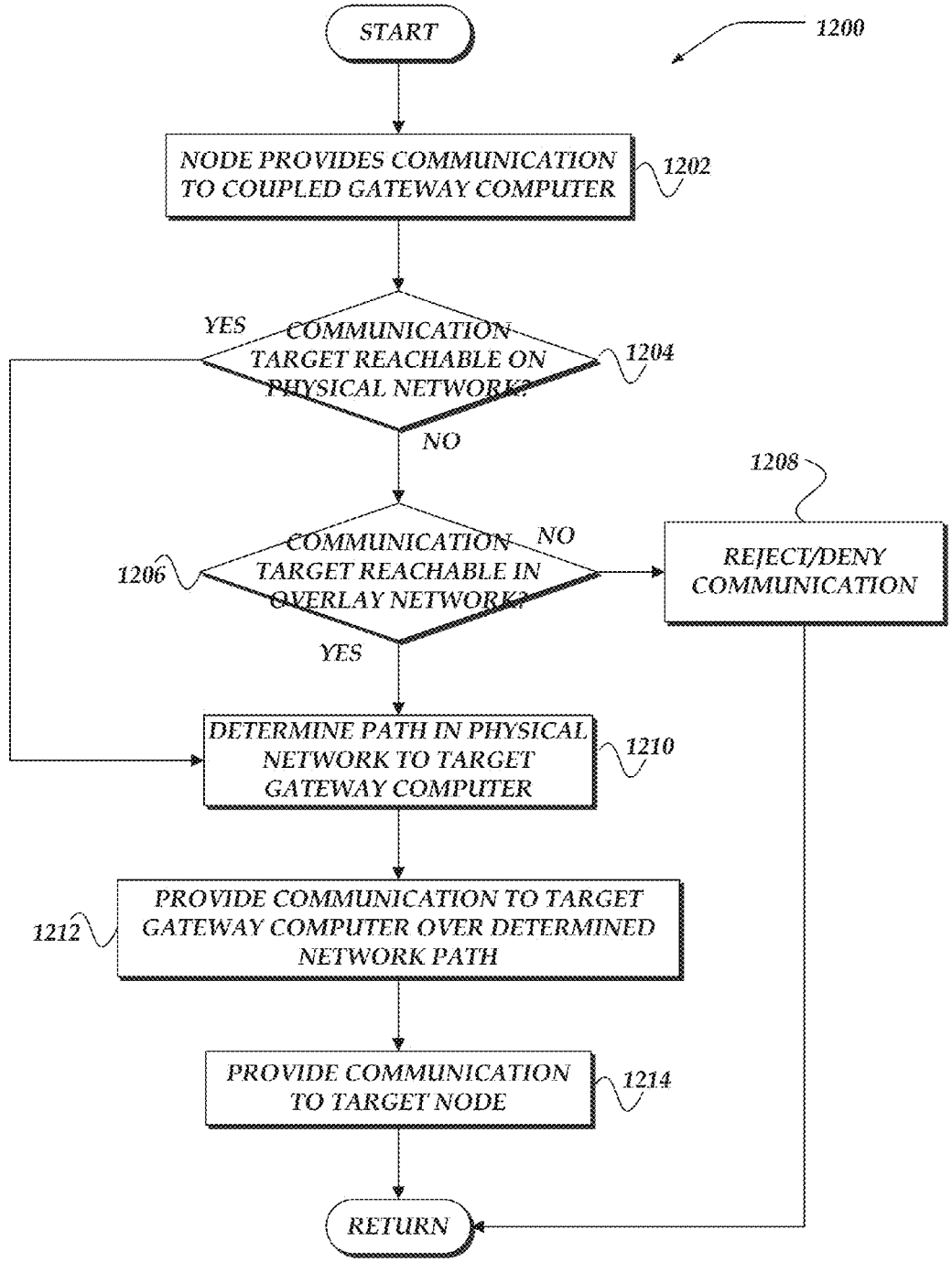
FIG. 12 illustrates an overview flowchart of a process for communicating using overlay networks with position independent insertion and tap points in accordance with at least one of the various embodiments.

FIG. 12 illustrates an overview flowchart of process 1200 for communicating using overlay networks with position independent insertion and tap points in accordance with at least one of the various embodiments. After a start block, at block 1202, in at least one of the various embodiments, a node associated with a mesh network may communicate information to a gateway computer that it may be physically coupled with using a physical network. In at least one of the various embodiments, the gateway computer may be an industrial security computer.

In at least one of the various embodiments, the communication may be generated directly by the node computer itself or it may originate from outside the mesh network. For example, in at least one of the various embodiments, the node computer may be an operations computer associated with a machine tool or robot that may be performing actions on a factory floor. In other embodiments, the node computer may be a client computer that a user may be operating. Further, in some embodiments, the node may be network interface that may be receiving communications from outside the mesh network. In any case the communication may be provided to a gateway computer that may be connected to the physical network.

At decision block 1204, in at least one of the various embodiments, if the target of the communication is reachable using the physical network, control may flow to block 1210; otherwise, control may flow to decision block 1206.

In at least one of the various embodiments, the gateway computer may be arranged to determine if the target of the communication is actually reachable from the node computer that is trying to communicate the information. In some cases, the communication target may be accessible directly over the physical network. In other cases, the node computer may be restricted to one or more overlay networks.

In at least one of the various embodiments, the gateway computer may be arranged to employ one or more rule-based policies to determine if the node computer that may be providing the communication should be restricted to one or more overlay networks. In some embodiments, the determination may be based on a variety of characteristics of the communication, such as, source, user access level, user role, destination, application type, machine/tool type (of sender or target), or the like, or combination thereof.

In at least one of the various embodiments, as discussed above, the gateway computer may be arranged to determine if a node computer may be access based on a list that identifies each computer that is allowed to access the gateway computer (e.g., a whitelist). In at least one of the various embodiments, the management platform computer may generate and provide whitelists to the one or more gateway computers that identify the computers that are allowed to access each gateway computer. In at least one of the various embodiments, whitelist information may be included in the overlay network information that may be provided to the mesh network.

In at least one of the various embodiments, the management platform computer may be arranged to provide overlay network information to the gateway computers in the mesh network to that may define the one or more overlay networks. In at least one of the various embodiments, the management platform computer may update the overlay network information to accommodate user inputs and/or changes to the topology of the mesh network. In at least one of the various embodiments, overlay network information may include configuration information that may be employed by the gateway computer to update their own/local configuration information.

At decision block 1206, in at least one of the various embodiments, if the communication target is reachable over an overlay network, control may flow block 1210; otherwise, control may flow to block 1208.

In at least one of the various embodiments, the gateway computer may determine if there are one or more overlay networks that may enable the communication to reach its intended target. In at least one of the various embodiments, as described above node computers may be restricted to using one or more overlay networks. The overlay networks may be employed in part to define the other nodes on the mesh network that may be reachable/visible/available to a given node computer. As well as, logical paths to the reachable node computers.

In at least one of the various embodiments, the one or more overlay networks may be defined using a management platform computer, such as, management platform server computer 116. In at least one of the various embodiments, if there is more than one overlay network, the management platform computer and/or the gateway computer may execute rule-based policies to determine which overlay network should be used. For example, the type of the communication may dictate which overlay network may be employed. Likewise, other characteristics of the communication, such as, source, access level, user role, destination, application types, machine/tool type (of sender or target), or the like, or combination thereof, may be employed for determining that applicable overlay network.

Also, in at least one of the various embodiments, the gateway computer may be arranged to include one or more overlay network whitelists that define which computers are allowed to access a particular overlay network. In at least one of the various embodiments, the management platform computer may generate and provide overlay network whitelists to the one or more gateway computers. In at least one of the various embodiments, whitelist information may be included with the overlay network information provided by the management platform computer.

At block 1208, in at least one of the various embodiments, since the communication target is not reachable over the open physical network or an overlay network, the communication may be denied and/or rejected. In at least one of the various embodiments, the denial/rejection of the communication may be logged and/or otherwise reported.

At block 1210, in at least one of the various embodiments, a physical network path in the physical network may be determined to reach the gateway computer that may be coupled to the target node of the communication.

In at least one of the various embodiments, as described above, node computers in the mesh network may be coupled via the physical network to a gateway computer. Accordingly, a route through the physical network to the gateway computer that is associated with the targeted node computer may be determined. In some embodiments, an overlay network may logically define an apparent network topology that is different than the topology of the physical network. Accordingly, the determined network path through the physical network may require that the communicated information be routed to one or more gateway computers, traffic monitoring computers (e.g., firewalls), industrial security computers, or the like, or combination thereof. However, from the perspective of the node computer that originated the communication, the route may appear to be a direct route as defined by an overlay network.

At block 1212, in at least one of the various embodiments, the communication may be provided over the physical network to the target gateway computer over the determined physical network path. At block 1214, in at least one of the various embodiments, the target gateway computer may provide the communication the target node computer, completing the communication.

In at least one of the various embodiments, if the target node computer generates a response to the communication, the above described process may operate in the reverse direction with the former sending node computer becoming the target node computer. Next, control may be returned to calling process.

Figure 13:
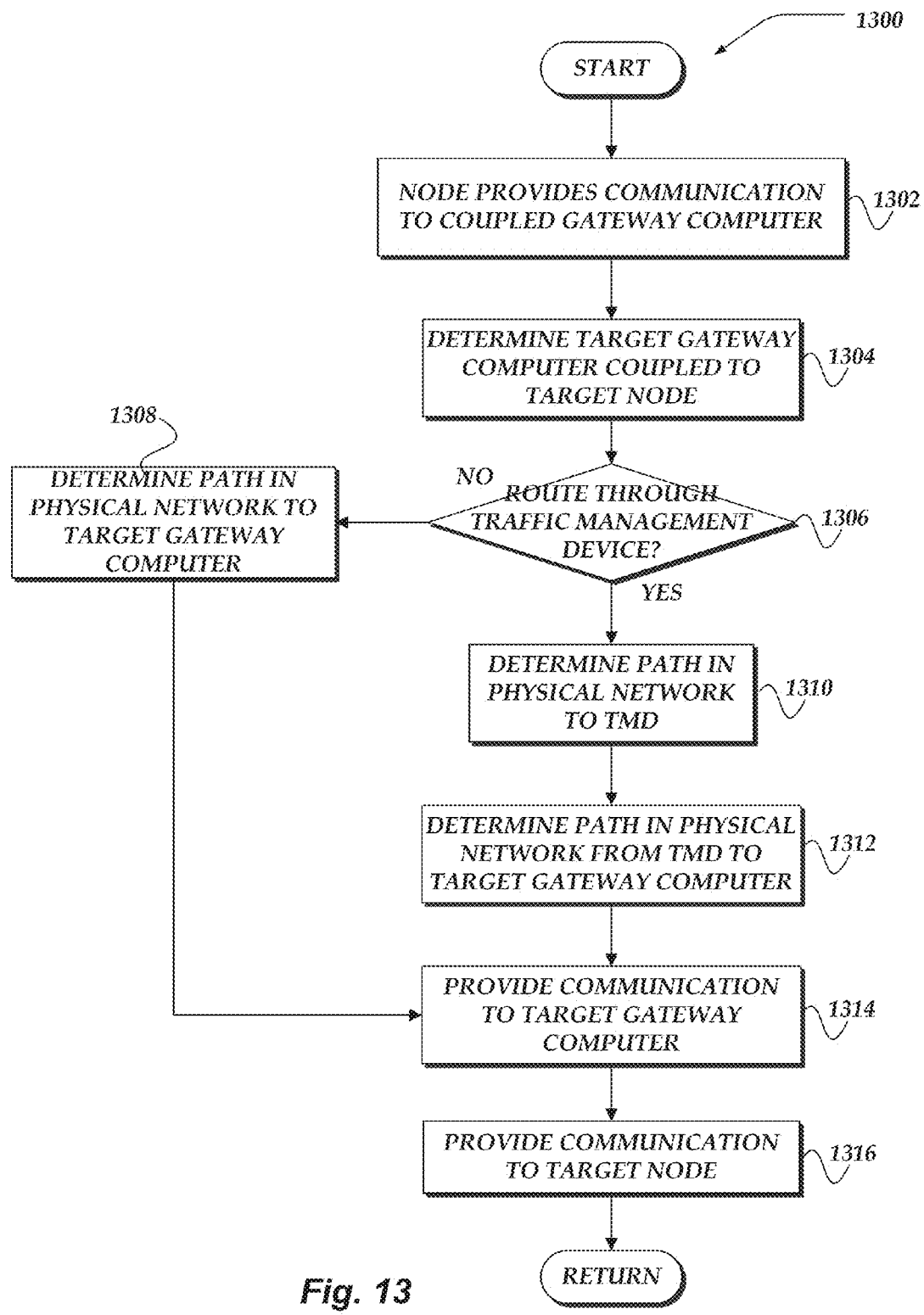
FIG. 13 illustrates a flowchart for a process for communicating in a mesh network that may include one or more overlay networks and one or more traffic management computers, in accordance with at least one of the various embodiments.

FIG. 13 illustrates a flowchart for process 1300 for communication in a mesh network that may include one or more overlay networks and one or more traffic management computers in accordance with at least one of the various embodiments. After a start block, at block 1302, in at least one of the various embodiments, a node computer may provide a communication targeted for another node computer (e.g., target node computer) in a mesh network. Accordingly, the node computer may provide the communication to the gateway computer over the physical network.

At block 1304, in at least one of the various embodiments, the gateway computer may determine a target gateway computer for the communication. As discussed above, gateway computers may be installed at the edge of the physical network, such that, node computers gain access to the mesh network (and the physical network) by way of a directly coupled gateway computer.

At decision block 1306, in at least one of the various embodiments, if the communication is determined to be routed through a traffic management computer, control may flow to block 1308; otherwise, control may flow to block 1310. In at least one of the various embodiments, a management platform computer may be employed to configure one or more the gateway computers to require some or all of network traffic from one or more node computers to be routed through one or more traffic management computers, such as, a firewall computer, an application delivery controller computer (ADC), or the like, or combination thereof.

At block 1308, in at least one of the various embodiments, a network path in the physical network to the target gateway computer may be determined. As described above, the gateway computer may determine a network path which to route the communication through the physical network to a target gateway computer that is coupled to the target node computer. The route may follow a route through the physical network that is different or separate from the overlay network. But, from the perspective of the node computer that is sending the communication, the communication will appear to be routed as if it was limited to a path on the overlay network.

At block 1310, in at least one of the various embodiments, a network path through the physical network to the TMD may be determined. In at least one of the various embodiments, a gateway computer may be arranged to determine a route through the physical network from the source gateway computer through one or more other gateway computers (if necessary) to the TMD. In at least one of the various embodiments, communication routed to the TMD may be analyzed and/or processed by the TMD according to its configuration.

In at least one of the various embodiments, as described above there may be more than one TMD installed on a physical network. If so, the source gateway computer may be arranged to determine a path to a particular TMD. Configuration information that may include rule-based policies may be executed by a gateway computer to determine a particular TMD which to provide the communication. In at least one of the various embodiments, communication traffic may be shared among the one or more TMD to load balanced the traffic. Also, in other cases, the closest (e.g., shortest path in physical network) TMD may be determined and provided the communication. In some embodiments, different TMD's may be responsible for managing different types of traffic, accordingly, a gateway computer may be arranged to determine a particular TMD based on the type of traffic, including, determining a TMD based on the source of the traffic or its destination.

At block 1312, in at least one of the various embodiments, a network path through the physical network from the one or more TMD's to the target gateway computer may be determined. Traffic that is provided to a TMD may have to be routed back to reach the target node computer. Thus, the traffic may also have to be routed to a target gateway computer that is associated with the target node computer. Accordingly, in at least one of the various embodiments, a route through the physical network from the TMD to the target gateway computer may be determined. At block 1314, in at least one of the various embodiments, the communication may be provided to the target gateway computer over the determined network path through the physical network. At block 1316, in at least one of the various embodiments, the target gateway computer may provide the communication to the target node computer.

In at least one of the various embodiments, the TMD may alter the target node computer and/or the contents of the communication, including, hiding the source of the communication. Next, control may be returned to a calling process.

Figure 14:
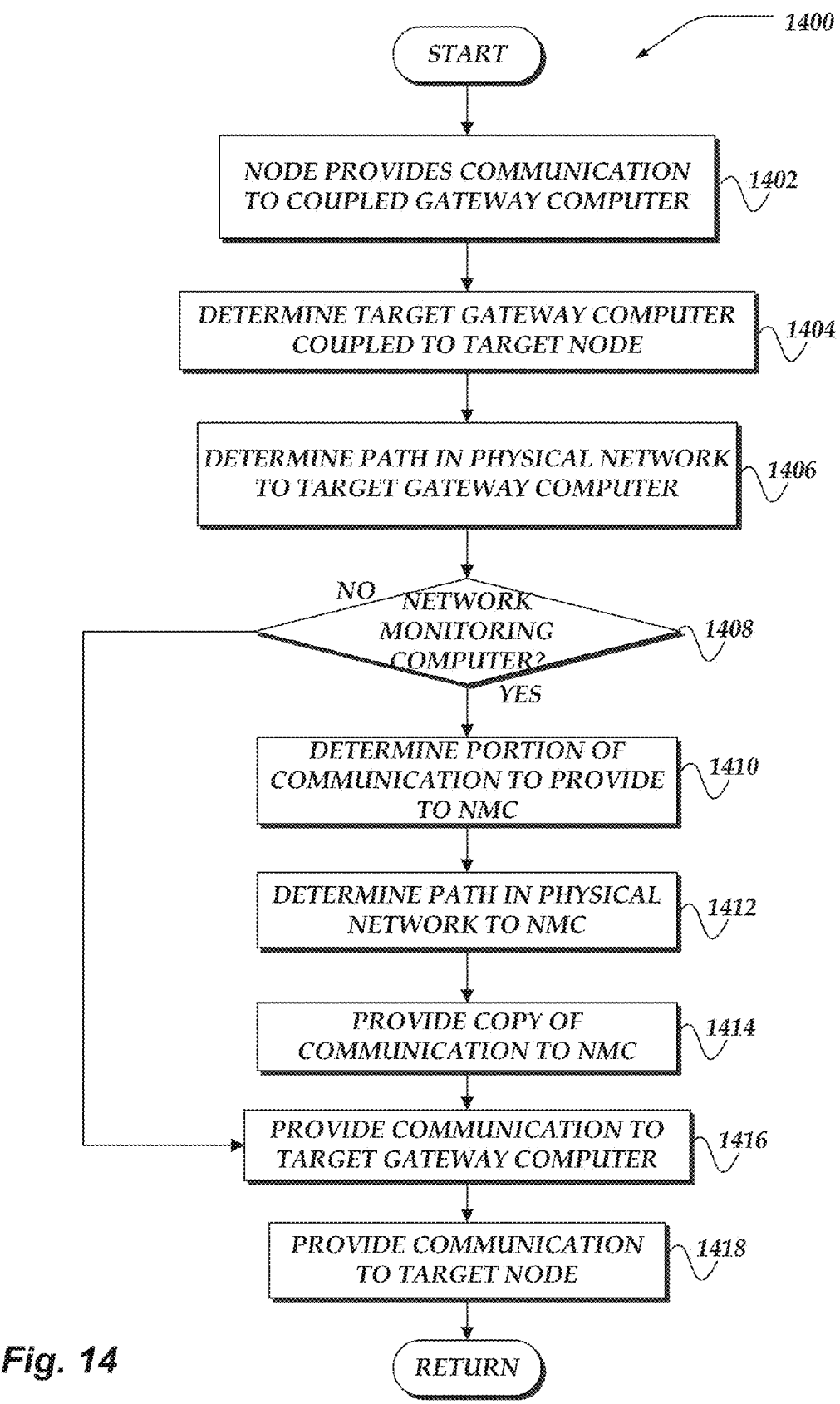
FIG. 14 illustrates a flowchart for a process for communicating in a mesh network that may include one or more overlay networks and one or more network monitoring computer, in accordance with at least one of the various embodiments.

FIG. 14 illustrates a flowchart for process 1400 for communication in a mesh network that may include one or more overlay networks and one or more network monitoring computers, such as, an intrusion detection computer in accordance with at least one of the various embodiments. After a start block, at block 1402, in at least one of the various embodiments, a node computer may provide a communication targeted for a node computer in a mesh network. Accordingly, the node computer may first provide the communication to a gateway computer using a physical network. As described in FIG. 11, the physical network of the mesh network may be accessed through one or more gateway computers. Accordingly, a node computer that is using the mesh network to communication may first provide its communication data to the particular gateway computer that it is associated with.

At block 1404, in at least one of the various embodiments, the gateway computer may determine a target gateway computer for the communication. As discussed above, gateway computers may be established at the edge points of the mesh network, such that, node computers gain access to the mesh network by way of the gateway computer that they are connected to.

In at least one of the various embodiments, the source gateway computer that is coupled to the source node computer may be arranged to execute one or more instructions for one or more rule-based policies to determine the target node computer. In at least one of the various embodiments, the identity of the target node computer may be explicitly included/defined in the communication from the source node computer. In other cases, the gateway computer may determine the specific target node computer based on one or more characteristics of the communication, such as, source, user access level, user role, destination, application type, machine/tool type (of sender or target), or the like, or combination thereof.

At block 1406, in at least one of the various embodiments, a network path in the physical network to the target gateway computer may be determined. As described above, the gateway computer may determine a physical network path to route the communication to the gateway computer that is coupled to the target node computer. The route may follow a different route through the physical network than the overlay network but from the perspective of the node computer that is sending the communication, the communication will appear to be routed over the overlay network rather than the network path through the physical network.

At decision block 1408, in at least one of the various embodiments, if the mesh network may be configured to provide some or all of the network traffic associated with one or more of the participants in the communication to a network monitoring computer (NMC), such as an intrusion detector computer, or the like, control may flow to block 1410; otherwise, control may flow to block 1416.

At block 1410, in at least one of the various embodiments, the gateway computer may determine the portion (some or all) of the communication that should be provided to the NMC. In at least one of the various embodiments, the gateway computer may be configured to determine a portion of the communication to provide to the NMC. In other embodiments, the gateway computer may be configured to provide all of the communication to the NMC. For example, in at least one of the various embodiments, the gateway computer may be arranged to provide particular network packets to an NMC. In other example, the NMC may be arranged to provide a defined percentage and/or sample rate of network traffic to the NMC. In at least one of the various embodiments, the gateway computer may execute one or more configuration rules that include pattern matching to determine if communication information should be provided to the NMC.

Further, in at least one of the various embodiments, there may be more than one NMC included in the mesh network. Accordingly, the gateway computer may be arranged execute one or more configuration rules that may determine which communication information (e.g., network traffic) may be provided to which NMC—if any.

At block 1412, in at least one of the various embodiments, the network path through the physical network from the gateway computer to the network monitoring computer may be determined. In at least one of the various embodiments, gateway computer may execute one or more configuration rules to determine a network path through the physical network which to route the communication information that may be provided to the one or more NMC's In at least one of the various embodiments, the configuration instructions may define different network paths depending on characteristics of the communication and/or the physical network. For example, characteristics such as, source, user access level, user role, destination, application type, machine/tool type (of sender or target), or the like, or combination thereof. Also, in at least one of the various embodiments, performance characteristics of the physical network, such as, latency, current traffic load, priority/quality guarantees, or the like, may be considered when determining the network path. For example, in at least one of the various embodiments, a gateway computer may determine a network path such that one or more network segments of the physical network may remain available for priority communications rather than being utilized by communication traffic forwarded to an NMC.

At block 1414, in at least one of the various embodiments, a copy of the portion of the communication traffic may be provided to the network monitoring computer over the determined path though the physical network. At block 1416, in at least one of the various embodiments, the communication may be provided to the target gateway computer. In at least one of the various embodiments, the communication may flow an overlay network to reach the target gateway computer. At block 1418, in at least one of the various embodiments, the target gateway computer may provide the communication to the target node computer. Next, control may be provided to a calling process.

Figure 15:
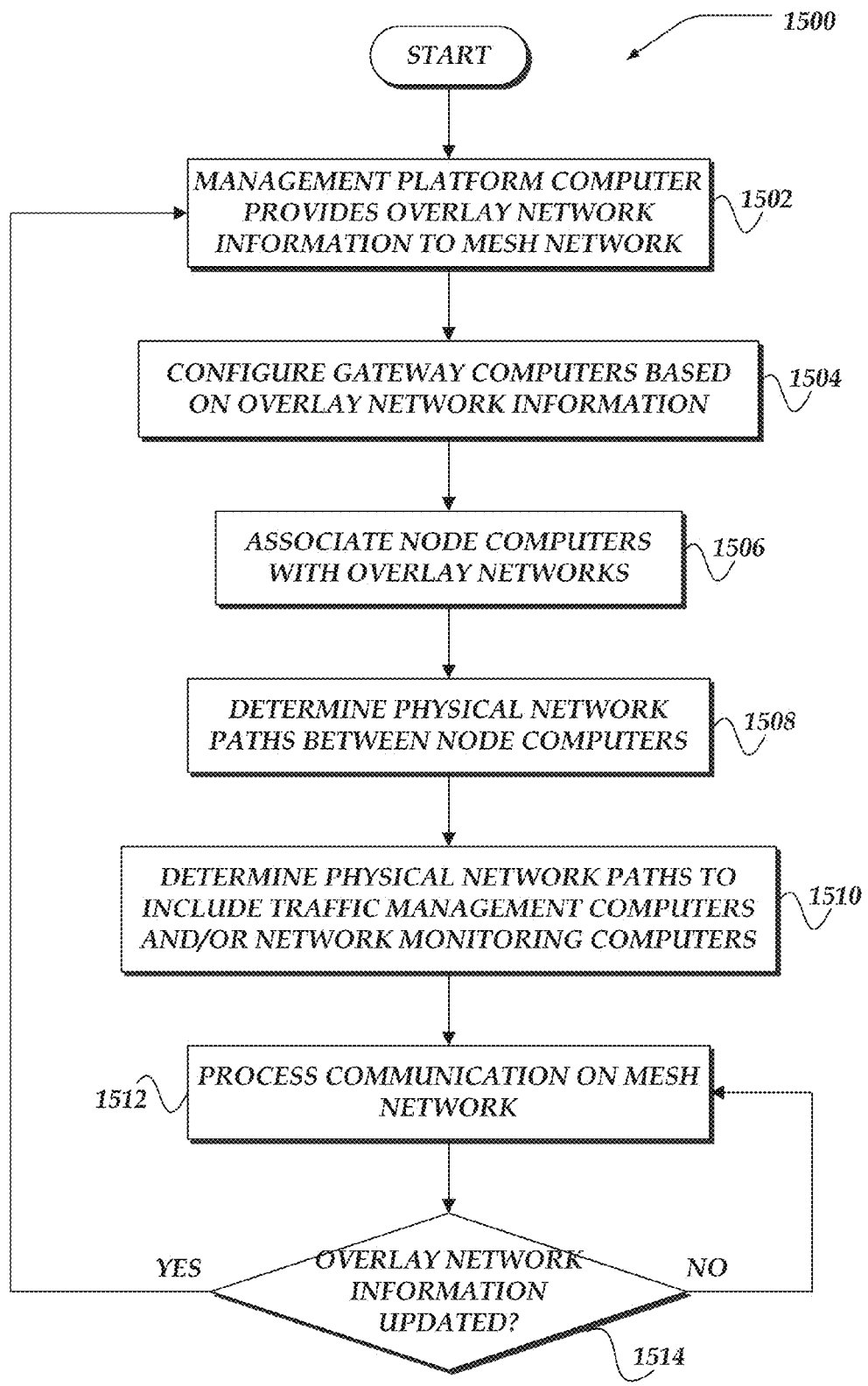
FIG. 15 illustrates an overview flowchart for of a process for communicating using overlay networks with position independent insertion and tap points in accordance with at least one of the various embodiments.

FIG. 15 illustrates an overview flowchart of process 1500 for communicating using overlay networks with position independent insertion and tap points in accordance with at least one of the various embodiments. After a start block, at block 1502, in at least one of the various embodiments, a management platform computer may provide overlay network to one or more of the gateway computers in a mesh network. In at least one of the various embodiments, the overlay network information may include configuration for defining one or more overlay networks. In at least one of the various embodiments, overlay network information may include configuration information, such as described above, including, policy based rules, routing tables, user access lists, computer white lists, computer black lists, lists of allowed applications, or the like, or combination thereof.

At block 1504, in at least one of the various embodiments, one or more gateway computers in the mesh network may be configured based on the overlay network information. In at least one of the various embodiments, as described above, the gateway computer may be arranged to employ the overlay network information to enforce one or more overlay network and their associated communication policies.

At block 1506, in at least one of the various embodiments, one or more node computers in the mesh network may be associated with one or more overlay networks based on the provided overlay network information. In at least one of the various embodiments, as described above, node computers may be associated with one or more overlay networks.

In at least one of the various embodiments, a management platform computer may be arranged to generate a graphical user interface that enables users to select one or more node computers to associate with an overlay network. In some embodiments, the management platform computer may automatically generate the overlay networks and the overlay network information based on the node computers selected by the user. Accordingly, in some embodiments, the physical topology of the mesh network, the existence of gateway computer, traffic management computers, network monitoring computer, or the like, may be hidden from the user.

At block 1508, in at least one of the various embodiments, the management platform computer may determine one or more physical network paths between the members (e.g., node computers, gateway computer, traffic management computers, network monitoring computers, or the like) of the mesh network. Alternatively, in at least one of the various embodiments, one or more gateway computers may be arranged to determine the physical networks in advance and/or on demand.

In at least one of the various embodiments, the overlay network information provided by the management platform computer may include the definitions of the one or more physical network paths.

At block 1510, in at least one of the various embodiments, as described for block 1508, one or more physical network paths may be modified to include providing some or all of the communication traffic between node computer to one or more traffic management computer and/or network monitoring computer.

At block 1512, in at least one of the various embodiments, communication between node computers may be processed by the gateway computers based on the provided overlay network information, the physical network paths, or the like. In at least one of the various embodiments, as described some or all of the communication of network traffic over the mesh network may be secured using one or more of Secure Sockets Layer (SSL), Transport Layer Security (TLS), Internet Protocol Security (IPsec), Public Key Infrastructure (PKI), encryption, authentication, or the like, or combination thereof.

At decision block 1514, in at least one of the various embodiments, if the overlay network information is modified or otherwise updated, control may flow to block 1502; otherwise, control may loop back to block 1512.

In at least one of the various embodiments, a user may employ the management platform computer to make changes to overlay networks and/or the overlay network information for a mesh network. Further, a management platform computer may be arranged to automatically update the overlay network information based on events and/or changes to the mesh network. In at least one of the various embodiments, if one or more node computers are added to a mesh network, the management platform computer may be arranged to add node computers to one or more overlay network based on the application of configuration information and/or policy rules. For example, in at least one of the various embodiments, if an industrial machine/workstation is added to manufacturing floor and coupled to a gateway computer, the management platform computer may be configured to update the overlay network information to include the new industrial machine/workstation. In at least one of the various embodiments, the management platform computer may be arranged to include configuration information and/or policy information that enables it to automatically identify and/or classify node computers that are added to the mesh network and update the overlay network information accordingly.

In other cases, a node computer, such as, an industrial machine/workstation may be physically moved to another location on the factory floor, resulting in the node computer being coupled to a different gateway computer. In at least one of the various embodiments, the management platform computer may modify the overlay network information to account for the fact that a previously known node computer is coupled with a different gateway computer and thus may require updated physical network paths, and so on.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

The above specification, examples, and data provide a complete description of the composition, manufacture, and use of the invention. Since many embodiments of the invention can be made without departing from the spirit and scope of the invention, the invention resides in the claims hereinafter appended.

What is claimed as new and desired to be protected by Letters Patent of the United States is:

1. A method for managing secure communication between a plurality of node computers over a network, wherein execution of logic by a network computing platform performs actions, comprising:
    when one or more overlay networks for two or more of the plurality of node computers is provided for securely communicating, configuring a mesh network between the two or more node computers, wherein the mesh network includes one or more of a plurality of gateway computers that provide secure access to the two or more node computers; and
    when a node computer is associated with the one or more overlay networks and sends a communication to one or more other node computers also associated with the one or more overlay networks, a gateway computer associated with the node computer performs further actions, comprising:
        selecting an overlay network based on the node computer and one or more characteristics of the communication with the one or more other node computers;
        determining one or more target gateway computers that are associated with the one or more other node computers based on the overlay network and a topology of the mesh network for secure communication;
        determining one or more physical paths for communication from the gateway computer to the one or more target gateway computers based on the topology of the mesh network, wherein the determining includes modifying the one or more physical paths to include a route to one or more traffic management computers based on the topology of the mesh network, and wherein the determining further includes modifying the one or more physical paths to include a route from the one or more traffic management computers to the one or more target gateway computers based on the topology of the mesh network; and
        securely sending the communication to the one or more target gateway computers over the one or more physical paths, wherein the one or more target gateway computers securely provide the communication to the one or more other node computers.

2. The method of claim 1, wherein determining the one or more physical paths to the one or more target gateway computers, further comprises:
    determining one or more portions of the communication based on configuration information and the one or more characteristics of the communication;
    determining one or more other physical paths that include a route to one or more network monitoring computers based on the topology of the mesh network; and
    providing the one or more determined portions of the communication to the one or more network monitoring computers over the one or more other physical paths.

3. The method of claim 1, wherein the one or more characteristics of the communication, further comprise, one or more of a source identity, a source address, a user identity, a user role, a destination identity, a destination address, an application type, a source machine type, a whitelist, or a target machine type.

4. The method of claim 1, wherein determining the one or more physical paths further comprises, determining a particular route through the mesh network based on one or more performance characteristics of the one or more physical paths.

5. The method of claim 1, wherein the secure communication includes one or more of Secure Sockets Layer (SSL), Transport Layer Security (TLS), Internet Protocol Security (IPsec), Public Key Infrastructure (PKI), encryption, or authentication.

6. The method of claim 1, wherein the network computing platform performs further actions, comprising when the one or more overlay networks for the two or more of the plurality of node computers are updated, reconfiguring the mesh network between the two or more node computers based on one or more updates to the one or more overlay networks.

7. The method of claim 1, further comprising, when the communication is sent by the node computer to one or more other node computers that are unassociated with the one or more overlay networks, determining the communication is undeliverable to the one or more other node computers.

8. A system for managing secure communication between a plurality of node computers over a network, comprising:
    a management platform computer, comprising:
    a transceiver that communicates over the network;
    a memory that stores at least instructions; and
    a processor device that executes instructions that perform actions, including:
        when one or more overlay networks for two or more of the plurality of node computers is provided for securely communicating, configuring a mesh network between the two or more node computers, wherein the mesh network includes one or more of a plurality of gateway computers that provide secure access to the two or more node computers; and
    a gateway computer, comprising:
    a transceiver that communicates over the network;
    a memory that stores at least instructions; and a processor device that executes instructions that perform actions, including:
when a node computer is associated with the one or more overlay networks and sends a communication to one or more other node computers also associated with the one or more overlay networks, the gateway computer associated with the node computer performs further actions, comprising:
selecting an overlay network based on the node computer and one or more characteristics of the communication with the one or more other node computers;
determining one or more target gateway computers that are associated with the one or more other node computers based on the overlay network and a topology of the mesh network for secure communication;
determining one or more physical paths for communication from the gateway computer to the one or more target gateway computers based on the topology of the mesh network, wherein the determining includes modifying the one or more physical paths to include a route to one or more traffic management computers based on the topology of the mesh network, and wherein the determining further includes modifying the one or more physical paths to include a route from the one or more traffic management computers to the one or more target gateway computers based on the topology of the mesh network; and
securely sending the communication to the one or more target gateway computers over the one or more physical paths, wherein the one or more target gateway computers securely provide the communication to the one or more other node computers; and
the node computer, comprising:
a transceiver that communicates over the network;
a memory that stores at least instructions; and
a processor device that executes instructions that perform actions, including:
sending the communication to the one or more other node computers also associated with the one or more overlay networks.

9. The system of claim 8, wherein determining the one or more physical paths to the one or more target gateway computers, further comprises:
determining one or more portions of the communication based on configuration information and the one or more characteristics of the communication;
determining one or more other physical paths that include a route to one or more network monitoring computers based on the topology of the mesh network; and
providing the one or more determined portions of the communication to the one or more network monitoring computers over the one or more other physical paths.

10. The system of claim 8, wherein the one or more characteristics of the communication, further comprise, one or more of a source identity, a source address, a user identity, a user role, a destination identity, a destination address, an application type, a source machine type, a whitelist, or a target machine type.

11. The system of claim 8, wherein determining the one or more physical paths further comprises, determining a particular route through the mesh network based on one or more performance characteristics of the one or more physical paths.

12. The system of claim 8, wherein the secure communication includes one or more of Secure Sockets Layer (SSL), Transport Layer Security (TLS), Internet Protocol Security (IPsec), Public Key Infrastructure (PKI), encryption, or authentication.

13. The system of claim 8, wherein the management platform computer processor executes instructions that perform further actions comprising, when the one or more overlay networks for the two or more of the plurality of node computers are updated, reconfiguring the mesh network between the two or more node computers based on one or more updates to the one or more overlay networks.

14. The system of claim 8, wherein the gateway computer processor device executes instructions that perform further actions comprising, when the communication is sent by the node computer to one or more other node computers that are unassociated with the one or more overlay networks, determining the communication is undeliverable to the one or more other node computers.

15. A processor readable non-transitory storage media that includes instructions for managing secure communication between a plurality of node computers over a network, wherein execution of the instructions by a processor device performs actions, comprising:
when one or more overlay networks for two or more of the plurality of node computers is provided for securely communicating, configuring a mesh network between the two or more node computers, wherein the mesh network includes one or more of a plurality of gateway computers that provide secure access to the two or more node computers; and
when a node computer is associated with the one or more overlay networks and sends a communication to one or more other node computers also associated with the one or more overlay networks, a gateway computer associated with the node computer performs further actions, comprising:
selecting an overlay network based on the node computer and one or more characteristics of the communication with the one or more other node computers;
determining one or more target gateway computers that are associated with the one or more other node computers based on the overlay network and a topology of the mesh network for secure communication;
determining one or more physical paths for communication from the gateway computer to the one or more target gateway computers based on the topology of the mesh network, wherein the determining includes modifying the one or more physical paths to include a route to one or more traffic management computers based on the topology of the mesh network, and wherein the determining further includes modifying the one or more physical paths to include a route from the one or more traffic management computers to the one or more target gateway computers based on the topology of the mesh network; and
securely sending the communication to the one or more target gateway computers over the one or more physical paths, wherein the one or more target gateway computers securely provide the communication to the one or more other node computers.

16. The media of claim 15, wherein determining the one or more physical paths to the one or more target gateway computers, further comprises:
determining one or more portions of the communication based on configuration information and the one or more characteristics of the communication;

determining one or more other physical paths that include a route to one or more network monitoring computers based on the topology of the mesh network; and providing the one or more determined portions of the communication to the one or more network monitoring computers over the one or more other physical paths.

17. The media of claim 15, wherein the one or more characteristics of the communication, further comprise, one or more of a source identity, a source address, a user identity, a user role, a destination identity, a destination address, an application type, a source machine type, a whitelist, or a target machine type.

18. The media of claim 15, wherein determining the one or more physical paths further comprises, determining a particular route through the mesh network based on one or more performance characteristics of the one or more physical paths.

19. The media of claim 15, wherein the secure communication includes one or more of Secure Sockets Layer (SSL), Transport Layer Security (TLS), Internet Protocol Security (IPsec), Public Key Infrastructure (PKI), encryption, or authentication.

20. The media of claim 15, wherein the network computing platform performs further actions, comprising when the one or more overlay networks for the two or more of the plurality of node computers are updated, reconfiguring the mesh network between the two or more node computers based on one or more updates to the one or more overlay networks.

21. A network computer for managing secure communication between a plurality of node computers over a network, comprising:

a transceiver that communicates over the network;

a memory that stores at least instructions; and a processor device that executes instructions that perform actions, including:

when one or more overlay networks for two or more of the plurality of node computers is provided for securely communicating, configuring a mesh network between the two or more node computers, wherein the mesh network includes one or more of a plurality of gateway computers that provide secure access to the two or more node computers; and when a node computer is associated with the one or more overlay networks and sends a communication to one or more other node computers also associated with the one or more overlay networks, a gateway computer associated with the node computer performs further actions, comprising:

selecting an overlay network based on the node computer and one or more characteristics of the communication with the one or more other node computers;

determining one or more target gateway computers that are associated with the one or more other node computers based on the overlay network and a topology of the mesh network for secure communication;

determining one or more physical paths for communication from the gateway computer to the one or more target gateway computers based on the topology of the mesh network, wherein the determining includes modifying the one or more physical paths to include a route to one or more traffic management computers based on the topology of the mesh network, and wherein the determining further includes modifying the one or more physical paths to include a route from the one or more traffic management computers to the one or more target gateway computers based on the topology of the mesh network; and securely sending the communication to the one or more target gateway computers over the one or more physical paths, wherein the one or more target gateway computers securely provide the communication to the one or more other node computers.

22. The network computer of claim 21, wherein determining the one or more physical paths to the one or more target gateway computers, further comprises:

determining one or more portions of the communication based on configuration information and the one or more characteristics of the communication;

determining one or more other physical paths that include a route to one or more network monitoring computers based on the topology of the mesh network; and providing the one or more determined portions of the communication to the one or more network monitoring computers over the one or more other physical paths.

23. The network computer of claim 21, wherein the one or more characteristics of the communication, further comprise, one or more of a source identity, a source address, a user identity, a user role, a destination identity, a destination address, an application type, a source machine type, a whitelist, or a target machine type.

24. The network computer of claim 21, wherein determining the one or more physical paths further comprises, determining a particular route through the mesh network based on one or more performance characteristics of the one or more physical paths.

25. The network computer of claim 21, wherein the secure communication includes one or more of Secure Sockets Layer (SSL), Transport Layer Security (TLS), Internet Protocol Security (IPsec), Public Key Infrastructure (PKI), encryption, or authentication.

26. The network computer of claim 21, wherein the network computer processor device executes instructions that performs further actions, comprising when the one or more overlay networks for the two or more of the plurality of node computers are updated, reconfiguring the mesh network between the two or more node computers based on one or more updates to the one or more overlay networks.

* * * * *